(12) United States Patent
Li

(10) Patent No.: US 10,243,401 B2
(45) Date of Patent: Mar. 26, 2019

(54) METHOD FOR CONTROLLING POWER SUPPLY AND SYSTEM

(71) Applicant: TENDYRON CORPORATION, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 0 days.

(21) Appl. No.: 15/561,245

(22) PCT Filed: Jan. 28, 2016

(86) PCT No.: PCT/CN2016/072519
§ 371 (c)(1),
(2) Date: Sep. 25, 2017

(87) PCT Pub. No.: WO2016/150248
PCT Pub. Date: Sep. 29, 2016

(65) Prior Publication Data
US 2018/0054087 A1 Feb. 22, 2018

(30) Foreign Application Priority Data
Mar. 24, 2015 (CN) .......................... 2015 1 0130570

(51) Int. Cl.
*H02J 50/10* (2016.01)
*H02J 50/80* (2016.01)
(Continued)

(52) U.S. Cl.
CPC .......... *H02J 50/10* (2016.02); *H02J 13/0006* (2013.01); *H02J 50/80* (2016.02); *H04L 12/10* (2013.01); *H04M 19/08* (2013.01)

(58) Field of Classification Search
CPC ........ H02J 50/10; H02J 50/80; H02J 13/0006; H02J 7/025; H02J 5/005; H02J 17/00; H04L 12/10; H04B 5/0037; H01F 38/14
See application file for complete search history.

(56) References Cited

U.S. PATENT DOCUMENTS

| 2011/0177787 | A1 | 7/2011 | Hwang et al. |
| 2014/0087658 | A1 | 3/2014 | Hou et al. |
| 2014/0142768 | A1* | 5/2014 | Uramoto .................. H02J 4/00 700/286 |

FOREIGN PATENT DOCUMENTS

| CN | 102882545 A | 1/2013 |
| CN | 103427127 A | 12/2013 |

OTHER PUBLICATIONS

English translation of the International Search Report dated Apr. 25, 2016 for corresponding International Application No. PCT/CN2016/072519, filed Jan. 28, 2016.
(Continued)

*Primary Examiner* — Carlos D Amaya
(74) *Attorney, Agent, or Firm* — Baker & Hostetler LLP

(57) ABSTRACT

A method for controlling power supply and a system are disclosed. The method includes: receiving an idle communication indicative instruction sent by a field energy supply device through a communication path; sending a waiting time extension instruction to the field energy supply device through the communication path, to instruct the field energy supply device to supply field energy continuously; and receiving a response to the waiting time extension instruction sent by the field energy supply device through the communication path, closing the communication path, and supplying with power by utilizing the field energy through a power supply path.

19 Claims, 9 Drawing Sheets

(51) Int. Cl.
*H02J 13/00* (2006.01)
*H04L 12/10* (2006.01)
*H04M 19/08* (2006.01)

(56) References Cited

OTHER PUBLICATIONS

English translation of the International Written Opinion dated Apr. 25, 2016 for corresponding International Application No. PCT/CN2016/072519, filed Jan. 28, 2016.

* cited by examiner

Prior Art

METHOD FOR CONTROLLING POWER SUPPLY AND SYSTEM

CROSS-REFERENCE TO RELATED APPLICATIONS

This Application is a Section 371 National Stage Application of International Application No. PCT/CN2016/072519, filed Jan. 28, 2016, the content of which is incorporated herein by reference in its entirety, and published as WO 2016/150248 on Sep. 29, 2016, not in English.

FIELD

The present disclosure relates to the electronic technology field, and more particularly to a device to be supplied with power, a field energy supply device, and a method and a system for controlling power supply.

BACKGROUND

In the related art, when an electronic apparatus such as a smart card communicates with a reader-writer, the smart card sense an electromagnetism field of the reader-writer (such as a POS machine, an NFC mobile phone) through its coil antenna, and can obtain power supply through the electromagnetism field of the reader-writer. However, the smart card cannot effectively utilize field energy generated by the reader-writer, resulting in power waste of the electromagnetism field of the reader-writer.

Taking a device to be supplied with power being a smart card as an example, as shown in FIG. 1, the smart card includes: a coil and a smart card chip. The coil is connected to the smart card chip through a communication path. When the smart card is connected to a field energy supply device (such as a POS read-writer, an NFC read-writer, an NFC mobile phone) via RF, NFC, or other communication path after entering a field domain (such as being placed in a radio frequency field), the smart card chip may consume field energy through the communication path regardless of whether the smart card chip needs to be in a working state, resulting in power waste. To fully utilize the field energy generated by the field energy supply device, a power supply path can be set to supply power for the smart card. However, if one more power supply coil is provided for the power supply path, the power supply coil may increase difficulties and cost of the power supply path, and also result in an impact on communication between the smart card and the reader-writer through the existing coil. If the power supply path shares the coil with the smart card chip, it is difficult to get the best power supply efficiency as the smart card chip will share a part of power of the coil. Therefore, it is a difficult problem in the related art to increase the power supply efficiency of the power supply path in the case that the power supply path shares the coil with the smart card chip without adding the power supply coil.

SUMMARY

The present disclosure seeks to solve at least one of the above problems.

A first objective of the present disclosure is to provide a method for controlling power supply.

A second objective of the present disclosure is to provide another method for controlling power supply.

A third objective of the present disclosure is to provide a device to be supplied with power.

A fourth objective of the present disclosure is to provide a field energy supply device.

A fifth objective of the present disclosure is to provide a system for controlling power supply.

In order to achieve the above objectives, technical solutions of the present disclosure are specifically realized as follows.

According to a first aspect of the present disclosure, a method for controlling power supply is provided, including: receiving an idle communication indicative instruction sent by a field energy supply device through a communication path; sending a waiting time extension instruction to the field energy supply device through the communication path, to instruct the field energy supply device to supply field energy continuously; and receiving a response to the waiting time extension instruction sent by the field energy supply device through the communication path, closing the communication path, and supplying power by utilizing the field energy through a power supply path According to a second aspect of the present disclosure, a method for controlling power supply is provided, including: when a triggering condition is satisfied, sending an idle communication indicative instruction to a device to be supplied with power; receiving a waiting time extension instruction sent by the device, to supply field energy continuously; and sending a response to the waiting time extension instruction to the device, to instruct the device to be supplied with power by utilizing the field energy.

According to a third aspect of the present disclosure, a device to be supplied with power is provided, including: a receiving and sending module, configured to receive an idle communication indicative instruction sent by a field energy supply device through a communication path, send a waiting time extension instruction to the field energy supply device through the communication path, to instruct the field energy supply device to supply field energy continuously, and receive a response to the waiting time extension instruction sent by the field energy supply device through the communication path; an on/off module, configured to close the communication path; and a power supplying module, configured to supply power by utilizing the field energy through a power supply path.

According to a fourth aspect of the present disclosure, a field energy supply device is provided, including: a communication module, configured to send an idle communication indicative instruction to a device to be supplied with power when a triggering condition is satisfied, receive a waiting time extension instruction sent by the device, to instruct a field energy supplying module to supply field energy continuously, send a response to the waiting time extension instruction to the device, to instruct the device to be supplied with power by utilizing the field energy; the field energy supplying module, configured to supply the field energy.

According to a fifth aspect of the present disclosure, a system for controlling power supply is provided, including the above device to be supplied with power and field energy supply device.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by skilled in the art without making creative labors.

DETAILED DESCRIPTION

Figure 1:
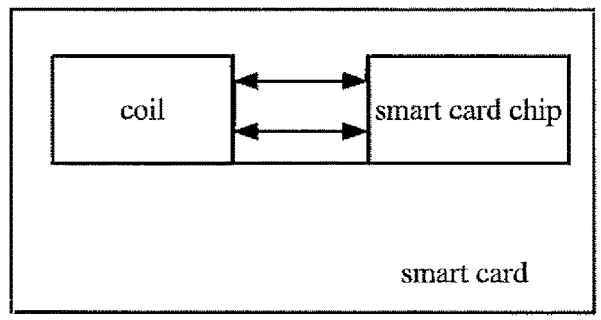
FIG. 1 is a block diagram of a smart card according to the related art.

Technical solutions of embodiments of the present disclosure will be described clearly and completely with reference to the drawings, and obviously, only part of embodiments are described herein. All other embodiments may be obtained by those skilled in the art based on the embodiments described, without any creative effort, and belong to the protection scope of the present disclosure.

In the description of the present disclosure, it should be understood that terms such as "central," "longitudinal," "lateral," "upper," "lower," "front," "rear," "left," "right," "vertical," "horizontal," "top," "bottom," "inner," and "outer," should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance.

In the description of the present disclosure, it should be noted that, unless specified or limited otherwise, the terms "mounted," "connected," and "coupled" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Embodiments of the present disclosure will be further described in detail with reference to the drawings.

Figure 2:
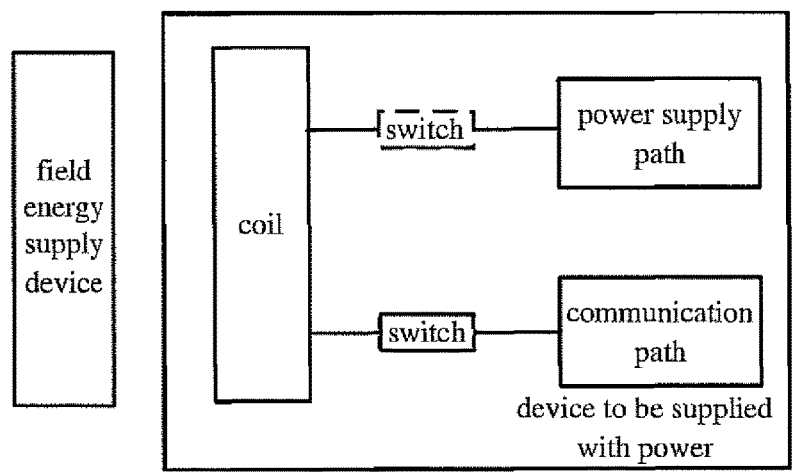
FIG. 2 is a block diagram of a system for controlling power supply according to an embodiment of the present disclosure.

The present disclosure is based on a system for controlling power supply. As shown in FIG. 2, the system for controlling power supply includes a device to be supplied with power (such as a smart card) and a field energy supply device (such as a POS reader-writer, an NFC reader-writer, an NFC mobile phone). The smart card is provided with a power supply path and a communication path that are connected to a coil, and a switch that can control connection or disconnection of the communication path.

Embodiment 1

Figure 3:
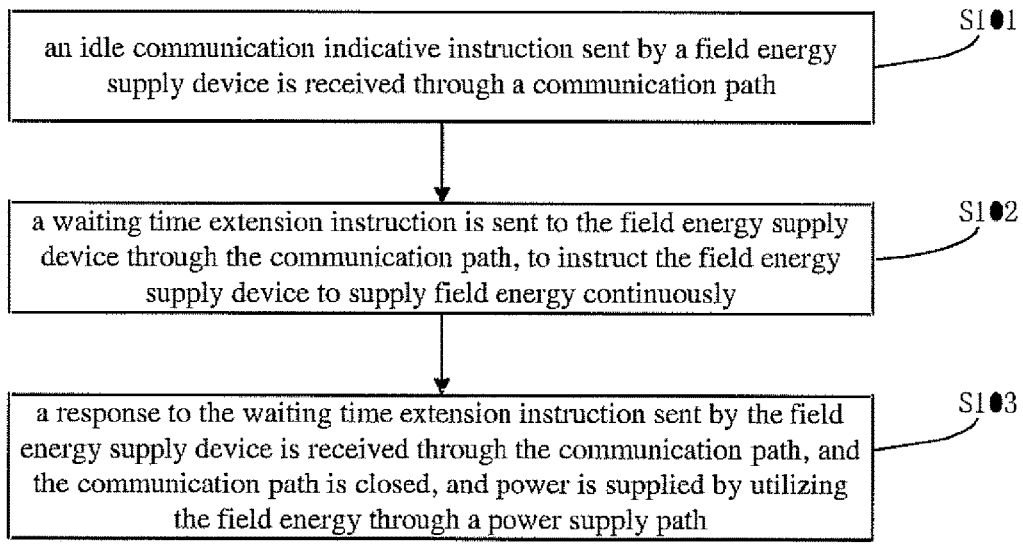
FIG. 3 is a flow chart of a method for controlling power supply according to embodiment 1 of the present disclosure.

Based on the above system for controlling power supply, a method for controlling power supply is provided in the present disclosure, as shown in FIG. 3, the method includes the followings.

In step S101, an idle communication indicative instruction sent by a field energy supply device is received through a communication path.

In an embodiment, when the device to be supplied with power (such a smart card) is in a field domain, the smart card is connected to and communicates with the field energy supply device (such as an NFC mobile phone) wirelessly through the communication path which is connected to the coil (for example, the coil has an NFC function) of the smart card. When an information interaction between the field energy supply device and the device to be supplied with power is completed, or when the field energy supply device waits for feedback information from the device to be supplied with power during one information interaction, or at any other time when the information interaction between the field energy supply device and the device to be supplied with power is paused, the field energy supply device can determine that it is in an idle state and send the idle communication indicative instruction to the device to be supplied with power. Certainly, as needed, the user can trigger the field energy supply device to send the idle communication indicative instruction to the device to be supplied with power through button triggering or other triggering ways. The device to be supplied with power receives the idle communication indicative instruction sent by the field energy supply device through the communication path. In addition, the communication path of the device to be supplied with power can be connected to a communication chip of the device to be supplied with power, so as to complete information interaction between the device to be supplied with power and other devices. For example, the communication path may be connected to a master chip or CPU of the smart card.

For example, when in the field domain, the smart card is connected wirelessly to an NFC coil of an NFC mobile phone through a built-in NFC coil, and the chip of the smart card can communicate with the NFC mobile phone through the communication path connected to the NFC coil. When a data interaction between the NFC mobile phone and the chip of the smart card is completed or is suspended, or when in an interval of the data interaction between the NFC mobile phone and the chip of the smart card, the NFC mobile phone can send the idle communication indicative instruction to the smart card. Certainly, as needed, the user can trigger the NFC mobile phone to send the idle communication indicative instruction to the smart card through button triggering or other triggering ways.

The idle communication indicative instruction can be a standard instruction defined by relevant standards and norms of smart card, or a custom instruction used to indicate that the current communication is in an idle state. As long as an instruction is able to achieve the above function, it belongs to the scope of the present disclosure.

In a technical solution provided in the present disclosure, the device to be supplied with power can be, but is not limited to, a smart card or other electronic apparatuses having an NFC function. The smart card may have functions of displaying, key inputting, or other functions. Furthermore, the smart card can include a secure chip, which can be used to complete functions of electronic signature, signature verification, dynamic password generation and/or verification. The device to be supplied with power includes a communication path and a power supply path. The communication path can communicate with other devices (such as a POS reader-writer, an NFC reader-writer, an NFC mobile phone) via wireless means (such as radio frequency, NFC, etc.). A chip having a contactless function can be, but is not limited to, a smart card chip, or an interface chip having a contactless function, which can be connected to CPU. That is, as long as a chip has a contactless function, it can be applied to the present embodiment.

In step S102, a waiting time extension instruction is sent to the field energy supply device through the communication path, to instruct the field energy supply device to supply field energy continuously.

When there is no need for the field energy supply device to communicate with the device to be supplied with power, the field energy supply device in the related art may cut off the field energy supply or reduce power of the field energy, and the device to be supplied with power cannot or can hardly use the field energy. Therefore, in an embodiment of the present disclosure, after receiving the idle communication indicative instruction sent by the field energy supply device, the device to be supplied with power sends a waiting time extension (WTX) instruction to the field energy supply device. The waiting time extension instruction can instruct the field energy supply device to turn on the field energy unless receiving an instruction for instructing to turn off the field energy or a power off instruction. The waiting time extension instruction can instruct a waiting time. The waiting time is a time during which the field energy supply device turns on the field energy additionally. The waiting time may be 1 to 2 s or other time, or can be determined according to user's demand or requirement computed by the device to be supplied with power, or can change depending on power level of the field energy.

In an embodiment of the present disclosure, the waiting time extension instruction may be further configured to instruct the field energy supply device to improve power of the field energy. In an embodiment, the waiting time extension (WTX) instruction may further include one or more bits of information, configured to instruct the field energy supply device to improve power of the field energy so as to supply higher power of energy thereby satisfying demand of the device to be supplied with power. In addition, because some field energy supply devices work in low power state when communicating and the low power supplied by the field energy supply device can not satisfy the demand of the device to be supplied with power, it is necessary for the field energy supply device to turn to a normal power work mode or a power work mode with higher power than a normal power, thus making the device to be supplied with power obtain more energy within a very short time.

In step S103, a response to the waiting time extension instruction sent by the field energy supply device is received through the communication path, and the communication path is closed (i.e., turned off), and power is supplied by utilizing the field energy through a power supply path.

In an embodiment, after receiving the WTX instruction, if the field energy supply device agrees to the WTX request, it sends a response to the WTX instruction to the device to be supplied with power, to inform the device to be supplied with power that the field energy supply device agrees to the WTX request and can supply field energy continuously. After the device to be supplied with power receives the response to the waiting time extension instruction sent by the field energy supply device, the communication path of the device to be supplied with power is closed, and at this time, the device to be supplied with power is supplied with power by utilizing the field energy through a power supply path.

In a specific embodiment, opening (i.e., turning on) and closing (i.e., turning off) of the power supply path may be in following states.

(1) In a first case, the power supply path and the communication path are both in an open state by default. When the communication path is used for a normal communication, the power supply path can supply power by utilizing remaining field energy while communication is performed via the communication path. After the device to be supplied with power closes the communication path, the power supply path can continue to supply power by utilizing the field energy. At this time, because of reduced energy consumption of the communication path, the power supply path can obtain more field energy.

(2) In a second case, when the device to be supplied with power is in a communicating state, the communication path is in the open state and the power supply path is in a closed state, thus ensuring communication stability of the communication path and eliminating impact of the power supply path on the communication path. When receiving the response to the WTX instruction sent by the field energy supply device, the device to be supplied with power can open the power supply path, such that the power supply path begins to supply power by utilizing the field energy. Certainly, the operation of opening the power supply path can be done at any time before power is supplied through the power supply path.

(3) In a third case, when the device to be supplied with power is in the communicating state, the communication path is in the open state and the power supply path is in the closed state, thus ensuring communication stability of the communication path and eliminating impact of the power supply path on the communication path. When receiving the response to the WTX instruction sent by the field energy supply device, the device to be supplied with power can close the communication path and open the power supply path, such that the power supply path begins to supply power by utilizing the field energy, and after the communication path is closed, the power supply path can continue to supply power by utilizing the field energy. At this time, because of reduced power consumption of communication path, the power supply path can obtain more field energy. Certainly, when the device to be supplied with power is fully charged, or it gets away from the field, or the device to be supplied with power needs to perform a data interaction or is in any other situation, in order to ensure normal use (such as normal communication) of the device to be supplied with power, the device to be supplied with power can close the power supply path and open the communication path. When performing the operations of closing the power supply path and opening the communication path, the device to be supplied with power can be triggered by an instruction sent by the field energy supply device, or be triggered by other information interaction device, or be triggered if the field energy cannot be received after the device to be supplied with power gets away from the field, or be triggered after the device to be supplied with power is fully charged. The present disclosure is not limited to triggering timing of the above operations as long as it is possible to trigger the device to be supplied with power to perform the above operations.

In addition, the power supply path can be a charging circuit and/or a direct current power supply circuit, that is, the power supply path can be connected to a rechargeable battery or a rechargeable capacitor or other device to be charged for charging, or be directly connected to a module to be supplied with power (such as a CPU or a smart card chip) of the device to be supplied with power, for supplying power to the module.

Compared with the related art, in the method for controlling power supply according to the present disclosure, when the communication path and the power supply path of the device to be supplied with power share a coil and when the communication path is in a connection state, the device to be supplied with power can obtain power from the coil of the field energy supply device while performing near field communication (such as NFC communication) with the field energy supply device, and the field energy provided by the field energy supply device can be used to supply power to the device to be supplied with power for operating, or can be used to charge a built-in power supply of the device to be supplied with power, such that communication and power supply can be performed simultaneously, thus improving utilization of the electronic apparatus, and preventing waste of power. In addition, in the present disclosure, the communication path can be closed, and when the communication path is in a closed state, the communication path and the chip or CPU connected to the communication path no longer consume power, such that the power supply path can receive power to the maximum and supply power, thus improving power supply efficiency.

In an embodiment of the present disclosure, before receiving the idle communication indicative instruction sent by the field energy supply device through the communication path, the method for controlling power supply of the present disclosure further includes: receiving an information interactive instruction sent by the field energy supply device through the communication path; and sending a response to the information interactive instruction to the field energy supply device through the communication path. In an embodiment, before the current communication is idle, the device to be supplied with power can perform a normal information interaction with the field energy supply device through the communication path. For example, the smart card performs a data communication with the NFC mobile phone through the communication path to complete finance function and other functions of the smart card.

In an embodiment of the present disclosure, the waiting time extension instruction instructs a waiting time. After closing the communication path, the method for controlling power supply of the present disclosure further includes: before the waiting time runs out, opening the communication path, and performing the step of sending another waiting time extension instruction to the field energy supply device through the communication path. In an embodiment, when it is necessary to continue power supply operation according to a judgment of the device to be supplied with power or the user's instruction, before the waiting time runs out, the device to be supplied with power can open the communication path, and send a waiting time extension instruction once again, so as to instruct the field energy supply device to supply field energy continuously, to satisfy power demand of the device to be supplied with power. Furthermore, the device to be supplied with power can directly send the waiting time extension instruction without waiting for the idle communication indicative instruction sent by the field energy supply device, saving interaction instructions and time. For example, if the waiting time is 1 to 2 s, within 10 ms before the waiting time runs out, the communication path is opened, and a WTX instruction is sent to NFC mobile phone once again through the communication path, to continue supplying power.

In an embodiment of the present disclosure, the waiting time extension instruction instructs a waiting time. After closing the communication path, the method for controlling power supply of the present disclosure further includes: before the waiting time runs out, opening the communication path, and sending a response to the idle communication indicative instruction to the field energy supply device through the communication path. In an embodiment, before the waiting time runs out, the device to be supplied with power can open the communication path in advance, and send the response to the idle communication indicative instruction to the field energy supply device through the communication path, such that the field energy supply device can continue to perform other operations (such as information interaction, or sending an idle communication indicative instruction after judging that the current communication is idle). Certainly, even if the waiting time does not run out, the communication path can be triggered to be opened by devices such as buttons or by other triggering ways as needed, or can be opened when the device to be supplied with power determines that it is necessary to open the communication path. For example, if the waiting time is 1 to 2 s, within 10 ms before the waiting time runs out, the communication path is opened, and then the smart card can send the response to the idle communication indicative instruction to the NFC mobile phone through the communication path, to enter a communicating state.

In an embodiment of the present disclosure, before opening the communication path, the method for controlling power supply of the present disclosure further includes: closing the power supply path. In an embodiment, before it is necessary to open the communication path, the power supply path can be closed, so as to ensure the communication stability of the communication path and to eliminate impact of the power supply path on the communication path.

In an embodiment of the present disclosure, after sending the response to the idle communication indicative instruction to the field energy supply device through the communication path, the method for controlling power supply of the present disclosure further includes: when receiving an information interactive instruction sent by the field energy supply device through the communication path, performing a step of sending a response to the information interactive instruction to the field energy supply device through the communication path. In an embodiment, if the device to be supplied with power sends the response to the idle communication indicative instruction to the field energy supply device through the communication path, it indicates that the extra field energy supply is completed, after that, the device to be supplied with power can receive an information interactive instruction for a normal communication sent by the field energy supply device through the communication path. Then the device to be supplied with power continues to complete the normal communication, and sends a response to the information interactive instruction to the field energy supply device through the communication path.

In an embodiment of the present disclosure, after sending the response to the idle communication indicative instruction to the field energy supply device through the communication path, the method for controlling power supply of the present disclosure further includes: when receiving another idle communication indicative instruction sent by the field energy supply device through the communication path, performing the step of sending another waiting time extension instruction to the field energy supply device through the communication path. In an embodiment, if the device to be supplied with power sends the response to the idle communication indicative instruction to the field energy supply device through the communication path, it indicates that the extra field energy supply is completed, after that, the device to be supplied with power can receive another idle communication indicative instruction sent by the field energy supply device through the communication path once again. Then the device to be supplied with power continues being supplied with power by utilizing the field energy, and sends another waiting time extension instruction to the field energy supply device through the communication path. Subsequent processes are in accordance with the foregoing, which are no longer described in detail herein.

Certainly, in an embodiment of the present disclosure, at any time when the device to be supplied with power receives an idle communication indicative instruction sent by the field energy supply device, if the device to be supplied with power is in a state no need to power supply due to sufficient power, being busy, according to user instruction, etc., the device to be supplied with power may not respond to the idle communication indicative instruction, or may send a response that rejects the idle communication indicative instruction. Thus power supply may not be started, such that impact on the work of the device to be supplied with power is avoided and power may be saved.

In an embodiment of the present disclosure, before receiving an idle communication indicative instruction sent by the field energy supply device through the communication path, the method for controlling power supply of the present disclosure further includes: receiving a searching instruction sent by the field energy supply device through the communication path; and sending a searching response to the field energy supply device through the communication path. In an embodiment, before sending an idle communication indicative instruction, the field energy supply device can send out a searching instruction, so as to find a device to be supplied with power that enters the field domain of the field energy supply device. After receiving the searching instruction, the device to be supplied with power sends a searching response to the field energy supply device that sends the searching instruction, so as to inform the field energy supply device of its information (for example, which may include information such as ID of the device to be supplied with power, etc.), such that subsequent information interaction and energy transfer can be proceeded. For example, an NFC mobile phone sends a card searching instruction every certain time interval (for example, every 1 ms), and if the smart card receives the card searching instruction after entering the field domain, the smart card sends a card searching response to the NFC mobile phone.

In an embodiment of the present disclosure, before receiving an information interactive instruction sent by the field energy supply device through the communication path, the method for controlling power supply of the present disclosure further includes: receiving a searching instruction sent by the field energy supply device through the communication path; and sending a searching response to the field energy supply device through the communication path. In an embodiment, before sending an information interactive instruction, the field energy supply device can send out a searching instruction, so as to find a device to be supplied with power that enters the field domain of the field energy supply device. After receiving the searching instruction, the device to be supplied with power sends a searching response to the field energy supply device that sends the searching instruction, so as to inform the field energy supply device of its information (for example, which may include information such as ID of the device to be supplied with power, etc.), such that subsequent information interaction and energy transfer can be proceeded. For example, an NFC mobile phone sends a card searching instruction every certain time interval (for example, every 1 ms), and if the smart card receives the card searching instruction after entering the field domain, the smart card sends a card searching response to the NFC mobile phone.

Embodiment 2

Figure 4:
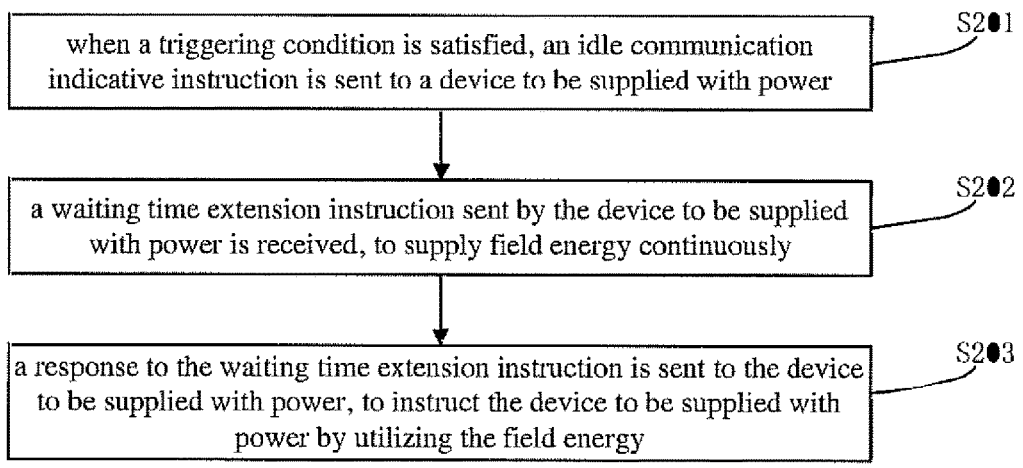
FIG. 4 is a flow chart of a method for controlling power supply according to embodiment 2 of the present disclosure.

Based on the above system for controlling power supply, a method for controlling power supply is provided in the present disclosure, as shown in FIG. 4, the method includes followings.

In step S201, when a triggering condition is satisfied, an idle communication indicative instruction is sent to a device to be supplied with power.

In an embodiment, when the device to be supplied with power (such as a smart card) is in a field domain, the smart card is connected to and wirelessly communicates with the field energy supply device (such as an NFC mobile phone) through the communication path which is connected to the coil (for example, the coil has an NFC function) of the smart card. When the triggering condition is satisfied, the field energy supply device sends the idle communication indicative instruction to the device to be supplied with power. The device to be supplied with power receives the idle communication indicative instruction sent by the field energy supply device through the communication path. In addition, the communication path of the device to be supplied with power can be connected to a communication chip of the device to be supplied with power, so as to complete information interaction between the device to be supplied with power and other devices. For example, the communication path may be connected to a master chip or CPU of the smart card.

In an embodiment of the present disclosure, the triggering condition includes: determining a current state as an idle communication state; or receiving a triggering instruction. In an embodiment, when an information interaction between the field energy supply device and the device to be supplied with power is completed, or when the field energy supply device waits for feedback information from the device to be supplied with power during one information interaction, or at any other time when the information interaction between the field energy supply device and the device to be supplied with power is paused, the field energy supply device can determine that it is in the idle communication state, and can send the idle communication indicative instruction to the device to be supplied with power. Certainly, as needed, the user can make the field energy supply device send the idle communication indicative instruction to the device to be supplied with power through button triggering or other triggering ways.

For example, when in the field domain, the smart card is connected to an NFC coil of an NFC mobile phone through a built-in NFC coil, and the chip of the smart card can communicate with the NFC mobile phone through the communication path connected to the NFC coil. When a data interaction between the NFC mobile phone and the chip of the smart card is completed or is suspended, or when in an interval of the data interaction between the NFC mobile phone and the chip of the smart card, the NFC mobile phone can send the idle communication indicative instruction to the smart card. Certainly, as needed, the user can trigger the NFC mobile phone to send the idle communication indicative instruction to the smart card through button triggering or other triggering ways.

The idle communication indicative instruction can be a standard instruction defined by relevant standards and norms of a smart card, or a custom instruction used to indicated that the current communication is in an idle state. As long as an instruction is able to achieve the above function, it belongs to the scope of the present disclosure.

In step S202, a waiting time extension instruction sent by the device to be supplied with power is received, to supply field energy continuously.

When there is no need for the field energy supply device to communicate with the device to be supplied with power, the field energy supply device in the related art may cut off the field energy supply or reduce power of the field energy (for example, a mobile phone having an NFC function may be configured in this way for saving power), and then the device to be supplied with power cannot or can hardly use the field energy. Therefore, in an embodiment of the present disclosure, after receiving an idle communication indicative instruction sent by the field energy supply device, the device to be supplied with power sends a waiting time extension (WTX) instruction to the field energy supply device. The waiting time extension instruction can instruct the field energy supply device to turn on the field energy unless receiving another instruction for instructing to turn off the field energy or a power off instruction. The waiting time extension instruction can instruct a waiting time. The waiting time is a time during which the field energy supply device turns on the field energy additionally. The waiting time may be 1 to 2 s or other time, or can be determined according to user's demand or requirement computed by the device to be supplied with power, or can change depending on power level of the field energy. After receiving the waiting time extension instruction sent by the device to be supplied with power, the field energy supply device continuously supplies field energy according to the waiting time extension instruction.

In an embodiment of the present disclosure, the waiting time extension instruction may be further configured to instruct the field energy supply device to improve power of the field energy. In an embodiment, the waiting time extension (WTX) instruction may further include one or more bits of information, configured to instruct the field energy supply device to improve power of the field energy, so as to supply higher power of energy, thereby satisfying demand of the device to be supplied with power. In addition, because some field energy supply devices work in low power state when communicating and the low power supplied by the field energy supply device can not satisfy the demand of the device to be supplied with power, it is necessary for the field energy supply device to turn to a normal power work mode or a power work mode with higher power than a normal power, thus making the device to be supplied with power obtain more energy within a very short time.

In step S203, a response to the waiting time extension instruction is sent to the device to be supplied with power, to instruct the device to be supplied with power by utilizing the field energy.

In an embodiment, after receiving the WTX instruction, if the field energy supply device agrees to the WTX request, it sends a response to the WTX instruction to the device to be supplied with power, to instruct the device to be supplied with power by utilizing the field energy.

Compared with the related art, in the method and system for controlling power supply according to the present disclosure, when the triggering condition is satisfied, the field energy supply device can send the idle communication indicative instruction to the device to be supplied with power, to inform the device to be supplied with power that the current communication is idle and during the idle communication time power can be supplied, and the field energy provided by the field energy supply device can be used to provide power to the device to be supplied with power for operating, or can used to charge a built-in power supply of the device to be supplied with power, and after receiving the waiting time extension instruction sent by the device to be supplied with power, the field energy supply device responds to it, thus can simultaneously communicate with and supply power to the device to be supplied with power, improving utilization of the electronic apparatus and preventing waste of power.

In an embodiment of the present disclosure, before sending an idle communication indicative instruction to the device to be supplied with power, the method for controlling power supply of the present disclosure further includes: sending an information interactive instruction to the device to be supplied with power; and receiving a response to the information interactive instruction sent by the device to be supplied with power. In an embodiment, before the current communication is idle, the field energy supply device can further perform a normal information interaction with the device to be supplied with power. For example, the NFC mobile phone performs a data communication with the smart card to cooperate with the smart card to complete finance function and other functions of the smart card.

In an embodiment of the present disclosure, the waiting time extension instruction instructs a waiting time. After sending the response to the waiting time extension instruction to the device to be supplied with power, the method for controlling power supply of the present disclosure further includes: before the waiting time runs out and when another waiting time extension instruction sent by the device to be supplied with power is received, performing a step of sending a response to the another waiting time extension instruction to the device to be supplied with power. In an embodiment, after receiving an waiting time extension instruction, the field energy supply device continuously supplies field energy, and sends the response to the waiting time extension instruction to the device to be supplied with power, and instructs the device to be supplied with power to be supplied with power by utilizing the field energy, thus the device to be supplied with power can repeatedly be supplied with power by utilizing the field energy, to satisfy the power demand of the device to be supplied with power. Furthermore, the device to be supplied with power can send the waiting time extension instruction directly without receiving the idle communication indicative instruction sent by the field energy supply device, saving interaction instructions and time.

In an embodiment of the present disclosure, the waiting time extension instruction instructs a waiting time. After sending the response to the waiting time extension instruction to the device to be supplied with power, the method for controlling power supply of the present disclosure further includes: before the waiting time runs out, receiving a response to the idle communication indicative instruction sent by the device to be supplied with power. In an embodiment, before the waiting time runs out, the field energy supply device can receive the response to the idle communication indicative instruction, indicating that the extra field energy supply is completed, such that the field energy supply device can go on to perform other operations (such as an information interaction or sending an idle communication indicative instruction once again after determining the current communication is idle once again).

In an embodiment of the present disclosure, after receiving the response to the idle communication indicative instruction sent by the device to be supplied with power, the method for controlling power supply of the present disclosure further includes: performing a step of sending an information interactive instruction to the device to be supplied with power. In an embodiment, if the field energy supply device receives the response to the idle communication indicative instruction sent by the device to be supplied with power, it indicates that the extra field energy supply is completed, after that, the field energy supply device can further send an information interactive instruction for a normal communication to the device to be supplied with power through the communication path, and continue to complete the normal communication with the device to be supplied with power.

In an embodiment of the present disclosure, after receiving the response to the idle communication indicative instruction sent by the device to be supplied with power, the method for controlling power supply of the present disclosure further includes: when the triggering condition is satisfied, performing a step of sending another idle communication indicative instruction to the device to be supplied with power. In an embodiment, if the field energy supply device receives the response to the idle communication indicative instruction sent by the device to be supplied with power, it indicates that the extra field energy supply is completed, when the above triggering condition is satisfied, the field energy supply device can further send an idle communication indicative instruction to the device to be supplied with power once again, thus making the device to be supplied with power be supplied with power by utilizing the field energy once again. Subsequent processes are in accordance with the foregoing, which are no longer described in detail herein.

In an embodiment of the present disclosure, when the triggering condition is satisfied and before an idle communication indicative instruction is sent to the device to be supplied with power, the method for controlling power supply of the present disclosure further includes: sending a searching instruction to the device to be supplied with power; receiving a searching response sent by the device to be supplied with power. In an embodiment, before sending an idle communication indicative instruction, the field energy supply device can send out the searching instruction, so as to find a device to be supplied with power that enters the field domain of the field energy supply device. After receiving the searching instruction, the device to be supplied with power sends a searching response to the field energy supply device that sends the searching instruction, so as to inform the field energy supply device of its information (for example, which may include information such as ID of the device to be supplied with power, etc.), such that subsequent information interaction and energy transfer can be proceeded. For example, an NFC mobile phone sends a card searching instruction every certain time interval (for example, every 1 ms), and if the smart card receives the card searching instruction after entering the field domain, the smart card sends a card searching response to the NFC mobile phone.

In an embodiment of the present disclosure, before sending an information interactive instruction to the device to be supplied with power, the method for controlling power supply of the present disclosure further includes: sending a searching instruction to the device to be supplied with power; receiving a searching response sent by the device to be supplied with power. In an embodiment, before sending an information interactive instruction, the field energy supply device can send out the searching instruction, so as to find a device to be supplied with power that enters the field domain of the field energy supply device. After receiving the searching instruction, the device to be supplied with power sends a searching response to the field energy supply device that sends the searching instruction, so as to inform the field energy supply device of its information (for example, which may include information such as ID of the device to be supplied with power, etc.), such that subsequent information interaction and energy transfer can be proceeded. For example, an NFC mobile phone sends a card searching instruction every certain time interval (for example, every 1 ms), and if the smart card receives the card searching instruction after entering the field domain, the smart card sends a card searching response to the NFC mobile phone.

Embodiment 3

Figure 5:
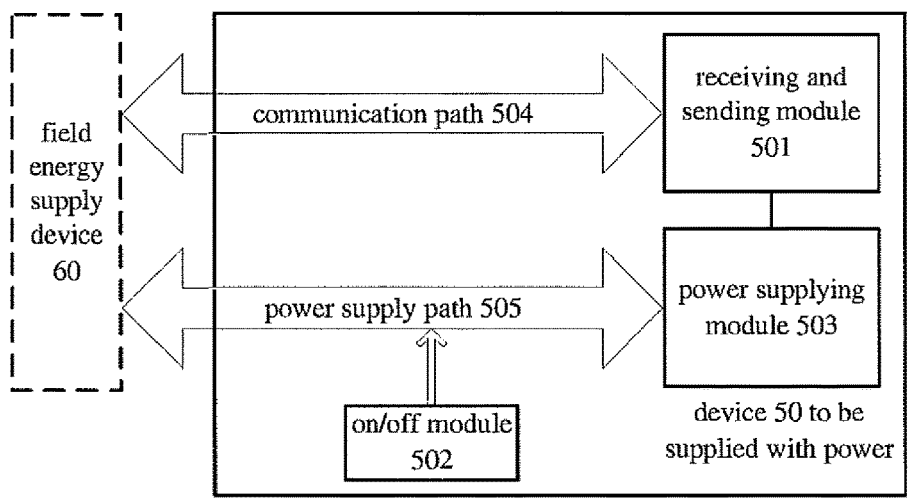
FIG. 5 is a block diagram of a device to be supplied with power according to embodiment 3 of the present disclosure.

A device 50 to be supplied with power is provided in this embodiment, on which the method for controlling power supply according to embodiment 1 can be applied. In this embodiment, only structure of the device 50 to be supplied with power is briefly described, and concerning other unmentioned parts, reference may be made to descriptions of embodiment 1. As shown in FIG. 5, the device 50 to be supplied with power includes a receiving and sending module 501, an on/off module 502, a power supplying module 503, a communication path 504 and a power supply path 505.

The receiving and sending module 501 is configured to receive an idle communication indicative instruction sent by a field energy supply device 60 through the communication path 504, send a waiting time extension instruction to the field energy supply device 60 through the communication path 504, to instruct the field energy supply device 60 to supply field energy continuously, and receive a response to the waiting time extension instruction sent by the field energy supply device 60 through the communication path 504.

The on/off module 502 is configured to close the communication path 504.

The power supplying module 503 is configured to supply power by utilizing the field energy through the power supply path 505.

Compared with the related art, in the device 50 to be supplied with power according to the present disclosure, when the communication path 504 and the power supply path 505 of the device to be supplied with power share a coil and when the communication path 504 is in a connection state, the device 50 to be supplied with power can obtain power from the coil of the field energy supply device 60 while performing near field communication (such as NFC communication) with the field energy supply device 60, and the field energy provided by the field energy supply device 60 can be used to supply power to the device 50 to be supplied with power for operating, or used to charge a built-in power supply of the device 50 to be supplied with power, such that communication and power supply can be performed simultaneously, thus improving utilization of the electronic apparatus and preventing waste of power. In addition, in the present disclosure, the communication path 504 can be closed by the on/off module 502, and when the communication path 504 is in a closed state, the communication path 504 and the chip or CPU connected to the communication path 504 no longer consume power, such that the power supply path 505 can receive power to the maximum and supply power, thus improving power supply efficiency.

In an embodiment of the present disclosure, the receiving and sending module 501 is further configured to: before receiving the idle communication indicative instruction sent by the field energy supply device 60 through the communication path 504, receive an information interactive instruction sent by the field energy supply device 60 through the communication path 504, and send a response to the information interactive instruction to the field energy supply device 60 through the communication path 504.

In an embodiment of the present disclosure, the waiting time extension instruction instructs a waiting time, after the communication path 504 is closed and before the waiting time runs out, the on/off module 502 is further configured to open the communication path 504, and the receiving and sending module 501 is further configured to send another waiting time extension instruction to the field energy supply device 60 through the communication path 504.

In an embodiment of the present disclosure, the waiting time extension instruction instructs a waiting time, after the communication path 504 is closed and before the waiting time runs out, the on/off module 502 is further configured to open the communication path 504, and the receiving and sending module 501 is further configured to send a response to the idle communication indicative instruction to the field energy supply device 60 through the communication path 504.

In an embodiment of the present disclosure, the on/off module 502 is further configured to close the power supply path 505 before opening the communication path 504.

In an embodiment of the present disclosure, the receiving and sending module 501 is further configured to: after sending the response to the idle communication indicative instruction to the field energy supply device 60 through the communication path 504 and when receiving an information interactive instruction sent by the field energy supply device 60 through the communication path 504, send a response to the information interactive instruction to the field energy supply device 60 through the communication path 504.

In an embodiment of the present disclosure, the receiving and sending module 501 is further configured to: after sending the response to the idle communication indicative instruction to the field energy supply device 60 through the communication path 504 and when receiving another idle communication indicative instruction sent by the field energy supply device 60 through the communication path 504, send another waiting time extension instruction to the field energy supply device 60 through the communication path 504.

In an embodiment of the present disclosure, the receiving and sending module 501 is further configured to: before receiving an idle communication indicative instruction sent by the field energy supply device 60 through the communication path 504, receive a searching instruction sent by the field energy supply device 60 through the communication path 504, and send a searching response to the field energy supply device 60 through the communication path 504.

In an embodiment of the present disclosure, the receiving and sending module 501 is further configured to: before receiving an information interactive instruction sent by the field energy supply device 60 through the communication path 504, receive a searching instruction sent by the field energy supply device 60 through the communication path 504, and send a searching response to the field energy supply device 60 through the communication path 504.

In an embodiment of the present disclosure, a waiting time extension instruction is configured to instruct the field energy supply device 60 to improve power of the field energy.

Embodiment 4

Figure 6:
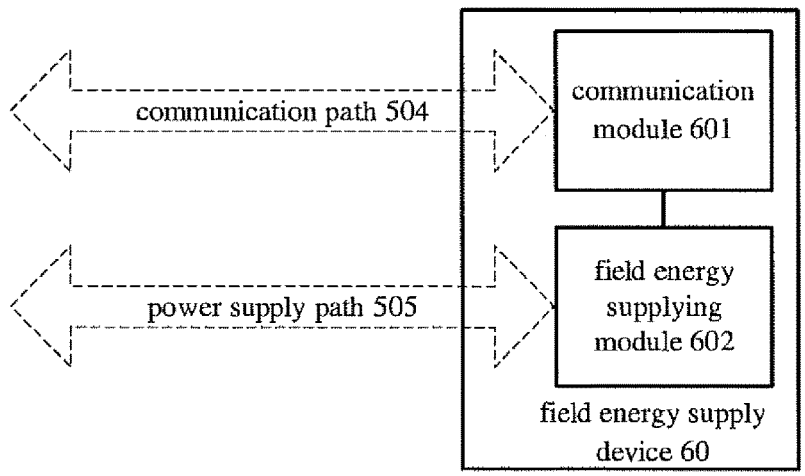
FIG. 6 is a block diagram of a field energy supply device according to embodiment 4 of the present disclosure.

A field energy supply device 60 is provided in this embodiment, on which the method for controlling power supply according to embodiment 2 can be applied. In this embodiment, only structure of the field energy supply device 60 is briefly described, and concerning unmentioned parts, reference may be made to descriptions of embodiment 2. As shown in FIG. 6, the field energy supply device 60 includes a communication module 601, and a field energy supplying module 602.

The communication module 601 is configured to send an idle communication indicative instruction to a device 50 to be supplied with power when a triggering condition is satisfied, receive a waiting time extension instruction sent by the device 50 to be supplied with power, to instruct the field energy supplying module 602 to supply field energy continuously, send a response to the waiting time extension instruction to the device 50 to be supplied with power, to instruct the device 50 to be supplied with power to be supplied with power by utilizing field energy.

The field energy supplying module 60 is configured to supply the field energy.

Compared with the related art, the field energy supply device 60 according to the present disclosure, when the triggering condition is satisfied, can send the idle communication indicative instruction to the device 50 to be supplied with power, to inform the device 50 to be supplied with power that the current communication is idle and during the idle communication time power can be supplied, and the field energy provided by the field energy supply device 60 can be used to supply power to the device 50 to be supplied with power for operating, or used to charge a built-in power supply of the device 50 to be supplied with power, and after receiving the waiting time extension instruction sent by the device 50 to be supplied with power, the field energy supply device 60 responds to it, thus can simultaneously communicate with and supply power to the device 50 to be supplied with power, improving utilization of the electronic apparatus and preventing waste of power.

In an embodiment of the present disclosure, the triggering condition including: determining a current state as an idle communication state; or receiving a triggering instruction.

In an embodiment of the present disclosure, the communication module 601 is further configured to: before sending the idle communication indicative instruction to the device 50 to be supplied with power, send an information interactive instruction to the device 50 to be supplied with power, and receive a response to the information interactive instruction sent by the device 50 to be supplied with power.

In an embodiment of the present disclosure, the waiting time extension instruction instructs a waiting time, and after the response to the waiting time extension instruction is sent to the device 50 to be supplied with power and before the waiting time runs out, when receiving another waiting time extension instruction sent by the device 50 to be supplied with power, the communication module 601 is further configured to send a response to the another waiting time extension instruction to the device 50 to be supplied with power.

In an embodiment of the present disclosure, the waiting time extension instruction instructs a waiting time, after the response to the waiting time extension instruction is sent to the device 50 to be supplied with power and before the waiting time runs out, the communication module 601 is further configured to: receive a response to the idle communication indicative instruction sent by the device 50 to be supplied with power.

In an embodiment of the present disclosure, the communication module 601 is further configured to send an information interactive instruction to the device 50 to be supplied with power after receiving the response to the idle communication indicative instruction sent by the device 50 to be supplied with power.

In an embodiment of the present disclosure, the communication module 601 is further configured to: after receiving the response to the idle communication indicative instruction sent by the device 50 to be supplied with power and when the triggering condition is satisfied, send another idle communication indicative instruction to a device 50 to be supplied with power.

In an embodiment of the present disclosure, the communication module 601 is further configured to: when the triggering condition is satisfied and before an idle communication indicative instruction is sent to the device 50 to be supplied with power, send a searching instruction to the device 50 to be supplied with power, and receive a searching response sent by the device 50 to be supplied with power.

In an embodiment of the present disclosure, the communication module 601 is further configured to: before sending an information interactive instruction to the device 50 to be supplied with power, send a searching instruction to the device 50 to be supplied with power, and receive a searching response sent by the device 50 to be supplied with power.

In an embodiment of the present disclosure, a waiting time extension instruction is further configured to instruct the field energy supply device 60 to improve power of the field energy, and the field energy supplying module 602 is further configured to improve power of the field energy, and output field energy with improved power.

Embodiment 5

Figure 7:
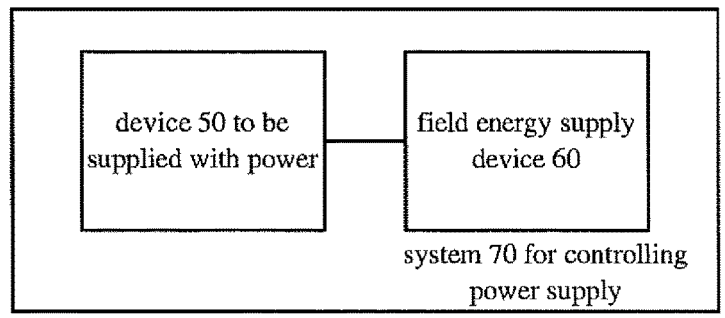
FIG. 7 is a block diagram of a system for controlling power supply according to embodiment 5 of the present disclosure.

A system for controlling power supply is provided in this embodiment, on which the methods for controlling power supply according to embodiment 1 and embodiment 2 are applied. As shown in FIG. 7, the system 70 for controlling power supply includes the device 50 to be supplied with power provided in embodiment 3 and the field energy supply device 60 provided in embodiment 4. Compared with the related art, in the system 70 for controlling power supply according to the present disclosure, when the communication path 504 and the power supply path 505 of the device 50 to be supplied with power share a coil and when the communication path 504 is in a connection state, the device 50 to be supplied with power can obtain power from the coil of the field energy supply device 60 while performing near field communication (such as NFC communication) with the field energy supply device 60, and the field energy supply device 60 can provide power to the device 50 to be supplied with power for operating, or can charge a built-in power supply of the device 50 to be supplied with power, such that communication and power supply can be performed simultaneously, thus improving utilization of the electronic apparatus and preventing waste of power. In addition, in the present disclosure, the communication path 504 can be closed by the on/off module 502, and when the communication path 504 is in a closed state, the communication path 504 and the chip or CPU connected to the communication path 504 no longer consume power, such that the power supply path 505 can receive power to the maximum and supply power, thus improving power supply efficiency.

Embodiment 6

Figure 8:
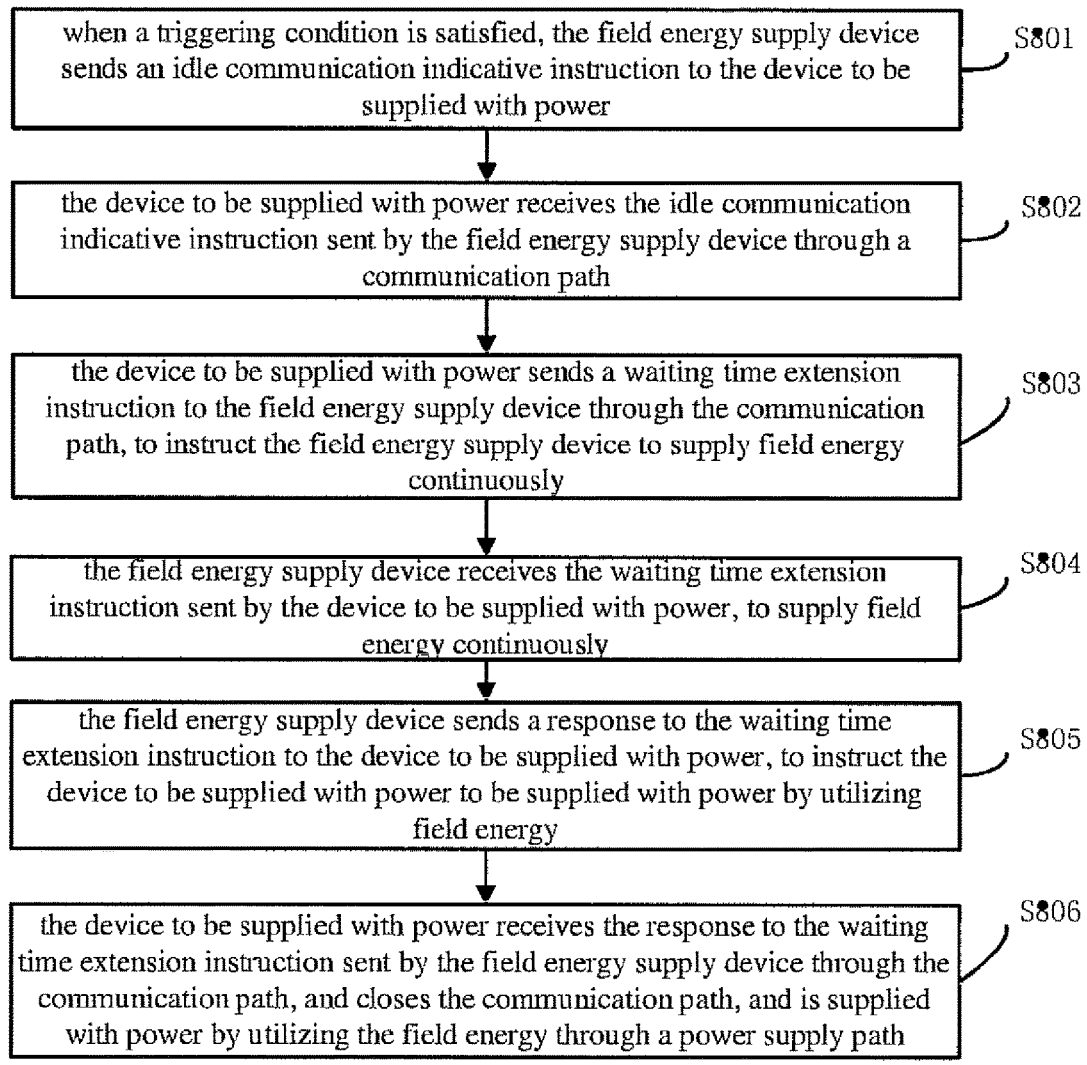
FIG. 8 is a flow chart of a method for controlling power supply according to embodiment 6 of the present disclosure.

A method for controlling power supply is provided in this embodiment. In the method for controlling power supply, information and energy interaction can be performed between a device to be supplied with power and a field energy supply device. The method for controlling power supply is just briefly described in this embodiment, and concerning technical features that are not described in detail, reference can be made to descriptions in embodiments 1 to 5. As shown in FIG. 8, the method for controlling power supply includes followings.

In step S801, when a triggering condition is satisfied, the field energy supply device sends an idle communication indicative instruction to the device to be supplied with power.

In step S802, the device to be supplied with power receives the idle communication indicative instruction sent by the field energy supply device through a communication path.

In step S803, the device to be supplied with power sends a waiting time extension instruction to the field energy supply device through the communication path, to instruct the field energy supply device to supply field energy continuously.

In step S804, the field energy supply device receives the waiting time extension instruction sent by the device to be supplied with power, to supply field energy continuously.

In step S805, the field energy supply device sends a response to the waiting time extension instruction to the device to be supplied with power, to instruct the device to be supplied with power to be supplied with power by utilizing field energy.

In step S806, the device to be supplied with power receives the response to the waiting time extension instruction sent by the field energy supply device through the communication path, and closes the communication path, and supplies with power by utilizing the field energy through a power supply path.

Compared with the related art, in the method for controlling power supply according to the present disclosure, when the communication path and the power supply path of the device to be supplied with power share a coil, and when the communication path is in a connection state, the device to be supplied with power can obtain power from the coil of the field energy supply device while performing near field communication (such as NFC communication) with the field energy supply device, and the field energy provided by the field energy supply device can be used to supply power to the device to be supplied with power for operating, or used to charge a built-in power supply of the device to be supplied with power, such that communication and power supply can be performed simultaneously, thus improving utilization of the electronic apparatus and preventing waste of power. In addition, in the present disclosure, the communication path can be closed, and when the communication path is in a closed state, the communication path and the chip or CPU connected to the communication path no longer consume power, such that the power supply path can receive power to the maximum and supply power, thus improving power supply efficiency.

In an embodiment of the present disclosure, the triggering condition including: determining a current state as an idle communication state; or receiving a triggering instruction.

In an embodiment of the present disclosure, before the field energy supply device sends the idle communication indicative instruction to the device to be supplied with power, the method for controlling power supply further includes: sending by the field energy supply device an information interactive instruction to the device to be supplied with power; receiving, by the device to be supplied with power, the information interactive instruction sent by the field energy supply device through the communication path; sending, by the device to be supplied with power, a response to the information interactive instruction to the field energy supply device through the communication path; and receiving, by the field energy supply device, the response to the information interactive instruction sent by the device to be supplied with power.

In an embodiment of the present disclosure, the waiting time extension instruction instructs a waiting time. After the device to be supplied with power closes the communication path, the method for controlling power supply further includes: before the waiting time runs out, opening the communication path by the device to be supplied with power, performing, by the device to be supplied with power, a step of sending another waiting time extension instruction to the field energy supply device through the communication path; and when the field energy supply device receives the another waiting time extension instruction sent by the device to be supplied with power, performing, by the field energy supply device, a step of sending a response to the another waiting time extension instruction to the device to be supplied with power.

In an embodiment of the present disclosure, the waiting time extension instruction instructs a waiting time. After the device to be supplied with power closes the communication path, the method for controlling power supply further includes: before the waiting time runs out, opening the communication path by the device to be supplied with power, sending, by the device to be supplied with power, a response to the idle communication indicative instruction to the field energy supply device through the communication path; and receiving, by the field energy supply device, the response to the idle communication indicative instruction sent by the device to be supplied with power.

In an embodiment of the present disclosure, before the device to be supplied with power opens the communication path, the method for controlling power supply further includes: closing the power supply path by the device to be supplied with power.

In an embodiment of the present disclosure, after the field energy supply device receives the response to the idle communication indicative instruction sent by the device to be supplied with power, the method for controlling power supply further includes: performing, by the field energy supply device, a step of sending an information interactive instruction to the device to be supplied with power; and when the device to be supplied with power receives the information interactive instruction sent by the field energy supply device through the communication path, performing, by the device to be supplied with power, a step of sending a response to the information interactive instruction to the field energy supply device through the communication path.

In an embodiment of the present disclosure, after the field energy supply device receives the response to the idle communication indicative instruction sent by the device to be supplied with power, the method for controlling power supply further includes: when the triggering condition is satisfied, performing, by the field energy supply device, a step of sending another idle communication indicative instruction to the device to be supplied with power; when receiving the another idle communication indicative instruction sent by the field energy supply device through the communication path, performing, by device to be supplied with power, the step of sending another waiting time extension instruction to the field energy supply device through the communication path.

In an embodiment of the present disclosure, when the triggering condition is satisfied, before the field energy supply device sends an idle communication indicative instruction to the device to be supplied with power, the method for controlling power supply further includes: sending a searching instruction to the device to be supplied with power by the field energy supply device; receiving, by the device to be supplied with power, the searching instruction sent by the field energy supply device through the communication path; sending, by the device to be supplied with power, a searching response to the field energy supply device through the communication path; and receiving, by the field energy supply device, the searching response sent by the device to be supplied with power.

In an embodiment of the present disclosure, before the field energy supply device sends an information interactive instruction to the device to be supplied with power, the method for controlling power supply further includes: sending, by the field energy supply device, a searching instruction to the device to be supplied with power; receiving, by the device to be supplied with power, the searching instruction sent by the field energy supply device through the communication path; sending, by the device to be supplied with power, a second searching response to the field energy supply device through the communication path; and receiving, by the field energy supply device the searching response sent by the device to be supplied with power.

In an embodiment of the present disclosure, a waiting time extension instruction is further configured to instruct the field energy supply device to improve power of the field energy, and the method for controlling power supply further includes: improving, by the field energy supply device, power of the field energy, and outputting field energy with improved power.

A specific application scenario of the present embodiment is provided below for reference, but protection scope of the present disclosure is not limited to herein.

1) The NFC mobile phone sends out a card searching instruction. After a smart card having an NFC function receives the card searching instruction, it sends a card searching response to the NFC mobile phone, in which the card searching response may include identity information of the smart card.

2) After the NFC mobile phone receives the card searching response, when in a situation in which transaction is needed, the NFC mobile phone sends a transaction instruction to the smart card. After receiving the transaction instruction, the smart card completes transaction, and sends a transaction response to the NFC mobile phone. Certainly, the transaction instruction and the transaction response can be completed in one communication or a plurality of communications.

3) When the NFC mobile phone judges that it is in an idle communication state, or when it receives a button trigger of the user, the NFC mobile phone sends a charging instruction (an idle communication indicative instruction) to the smart card, to inform the smart card that it is possible to be charged at this time. After receiving the charging instruction, the smart card sends a WTX instruction (waiting time extension instruction) to the NFC mobile phone, in which the WTX instruction is configured to instruct the NFC mobile phone to go on opening energy field for a while, such that the smart card can be charged by utilizing the field energy. The waiting time extension instruction can define an extended waiting time to 1 s~2 s.

4) After receiving the WTX instruction, if the NFC mobile phone accepts the request of the WTX instruction, it sends a response to the WTX instruction to the smart card. After receiving the response to the WTX instruction, the smart card closes the communication path. That is, a connection between the smart card chip and the smart card coil is cut down, and a charging operation is performed through a power supply path, in which length of charging time depends on length of the extended waiting time.

5) Before the extended waiting time runs out (for example, 10 ms earlier, for waking up the smart card), the communication path is opened, and there may be two cases: the smart card can send a WTX instruction to the NFC mobile phone once again, so as to be charged continually; or the smart card can send a response to the charging instruction to the NFC mobile phone, and the NFC mobile phone finishes the charging operation after receiving the response to the charging instruction.

A system for controlling power supply is also provided in the present embodiment. Information and energy interaction between the device to be supplied with power and the field energy supply device of the system for controlling power supply is realized by using the method for controlling power supply according to the present embodiment, which is not described in detail.

Embodiment 7

Figure 9:
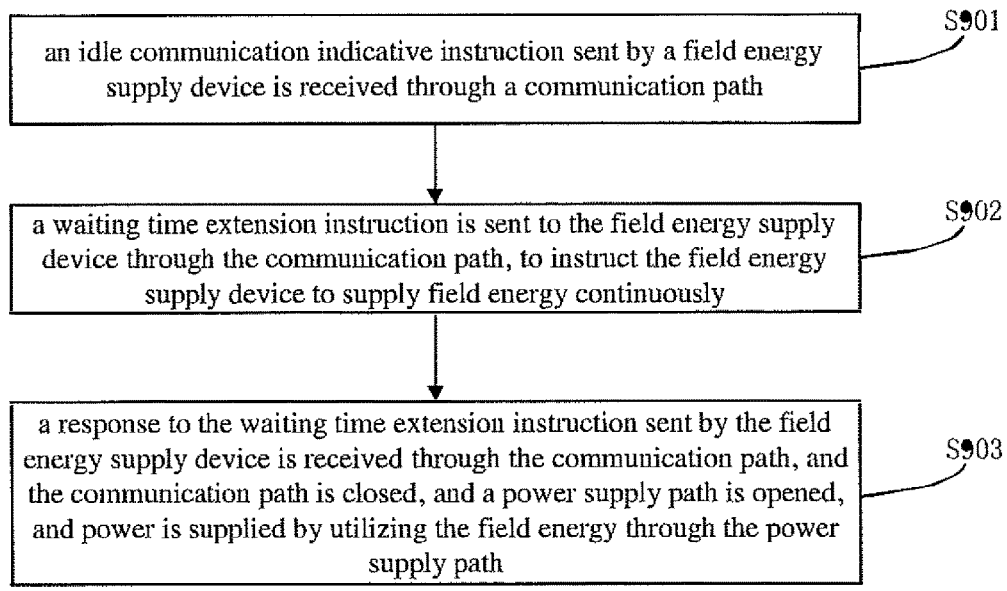
FIG. 9 is a flow chart of a method for controlling power supply according to embodiment 7 of the present disclosure.

This embodiment just provides a brief description of a specific implementation of the present disclosure, and concerning to other parts not described in detail, reference may be made to descriptions in embodiment 1. As shown in FIG. 9, a method for controlling power supply includes followings.

In step S901, an idle communication indicative instruction sent by a field energy supply device is received through a communication path.

In step S902, a waiting time extension instruction is sent to the field energy supply device through the communication path, to instruct the field energy supply device to supply field energy continuously.

In step S903, a response to the waiting time extension instruction sent by the field energy supply device is received through the communication path, and the communication path is closed, and a power supply path is opened, and power is supplied by utilizing the field energy through the power supply path.

Compared with the related art, in the method for controlling power supply according to the present disclosure, when the communication path and the power supply path of the device to be supplied with power share a coil and when the communication path is in a connection state, the power supply path is in a closed state, thus ensuring communication stability of the communication path and eliminating impact of the power supply path on the communication path. When the communication is idle, the communication path can be closed, and when the communication path is in a closed state, the communication path and the chip or CPU connected to the communication path no longer consume power, such that the power supply path can receive power to the maximum and supply power, thus improving power supply efficiency. Therefore, it is possible for the device to be supplied with power according to the present disclosure to obtain as much power as possible from the coil of the field energy supply device without affecting the near field communication (such as NFC communication) with the field energy supply device, and the field energy provided by the field energy supply device can be used to supply power to the device to be supplied with power for operating, or can be used to charge a built-in power supply of the device to be supplied with power, such that communication and power supply can be performed simultaneously, thus improving utilization of the electronic apparatus, and preventing waste of power.

In an embodiment of the present disclosure, before receiving the idle communication indicative instruction sent by the field energy supply device through the communication path, the method for controlling power supply further includes: receiving an information interactive instruction sent by the field energy supply device through the communication path; sending a response to the information interactive instruction to the field energy supply device through the communication path.

In an embodiment of the present disclosure, the waiting time extension instruction instructs a waiting time. After closing the communication path, the method for controlling power supply further includes: before the waiting time runs out, opening the communication path, and performing the step of sending another waiting time extension instruction to the field energy supply device through the communication path.

In an embodiment of the present disclosure, the waiting time extension instruction instructs a waiting time. After closing the communication path, the method for controlling power supply further includes: before the waiting time runs out, opening the communication path, and sending a response to the idle communication indicative instruction to the field energy supply device through the communication path.

In an embodiment of the present disclosure, before opening the communication path, the method for controlling power supply further includes: closing the power supply path.

In an embodiment of the present disclosure, after sending the response to the idle communication indicative instruction to the field energy supply device through the communication path, the method for controlling power supply further includes: when receiving an information interactive instruction sent by the field energy supply device through the communication path, performing a step of sending a response to the information interactive instruction to the field energy supply device through the communication path.

In an embodiment of the present disclosure, after sending the response to the idle communication indicative instruction to the field energy supply device through the communication path, the method for controlling power supply further includes: when receiving another idle communication indicative instruction sent by the field energy supply device through the communication path, performing the step of sending another waiting time extension instruction to the field energy supply device through the communication path.

In an embodiment of the present disclosure, before receiving an idle communication indicative instruction sent by the field energy supply device through the communication path, the method for controlling power supply further includes: receiving a searching instruction sent by the field energy supply device through the communication path; sending a searching response to the field energy supply device through the communication path.

In an embodiment of the present disclosure, before receiving an information interactive instruction sent by the field energy supply device through the communication path, or the method for controlling power supply further includes: receiving a searching instruction sent by the field energy supply device through the communication path; sending a searching response to the field energy supply device through the communication path.

In an embodiment of the present disclosure, a waiting time extension instruction is further configured to instruct the field energy supply device to improve power of the field energy.

A system for controlling power supply is also provided in the present embodiment. The system for controlling power supply uses the method for controlling power supply according to the present embodiment, which is not described in detail.

Embodiment 8

Figure 10:
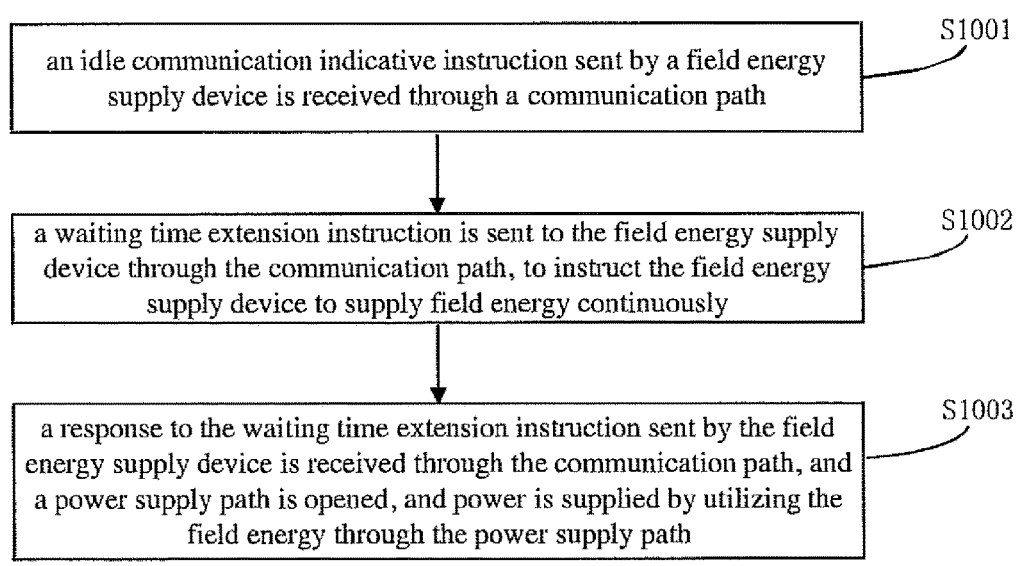
FIG. 10 is a flow chart of a method for controlling power supply according to embodiment 8 of the present disclosure.

This embodiment just provides a brief description of another specific implementation of the present disclosure, and concerning other parts not described in detail, reference is made to descriptions in embodiment 1. As shown in FIG. 10, a method for controlling power supply includes followings.

In step S1001, an idle communication indicative instruction sent by a field energy supply device is received through a communication path.

In step S1002, a waiting time extension instruction is sent to the field energy supply device through the communication path, to instruct the field energy supply device to supply field energy continuously.

In step S1003, a response to the waiting time extension instruction sent by the field energy supply device is received through the communication path, and a power supply path is opened, and power is supplied by utilizing the field energy through the power supply path.

Compared with the related art, in the method for controlling power supply according to the present disclosure, when the communication path and the power supply path of the device to be supplied with power share a coil and when the communication path is in a connection state, the power supply path is in a closed state, thus ensuring communication stability of the communication path and eliminating impact of the power supply path on the communication path.

When the communication is idle, the power supply path can be opened, such that the power supply path can be used to supply power by utilizing the field energy. Therefore, it is possible for the device to be supplied with power according to the present disclosure to obtain as much power as possible from the coil of the field energy supply device without affecting the near field communication (such as NFC communication) with the field energy supply device, and the field energy provided by the field energy supply device can be used to supply power the device to be supplied with power for operating, or can be used to charge a built-in power supply of the device to be supplied with power, such that communication and power supply can be performed simultaneously, thus improving utilization of the electronic apparatus, and preventing waste of power.

In an embodiment of the present disclosure, before receiving the idle communication indicative instruction sent by the field energy supply device through the communication path, the method for controlling power supply further includes: receiving an information interactive instruction sent by the field energy supply device through the communication path; sending a response to the information interactive instruction to the field energy supply device through the communication path.

In an embodiment of the present disclosure, the waiting time extension instruction instructs a waiting time. After opening the power supply path, the method for controlling power supply further includes: when the waiting time runs out, performing the step of sending another waiting time extension instruction to the field energy supply device through the communication path.

In an embodiment of the present disclosure, the waiting time extension instruction instructs a waiting time. After opening the power supply path, the method for controlling power supply further includes: when the waiting time runs out, sending a response to the idle communication indicative instruction to the field energy supply device through the communication path.

In an embodiment of the present disclosure, before opening the power supply path, the method for controlling power supply further includes: closing the power supply path.

In an embodiment of the present disclosure, after sending the response to the idle communication indicative instruction to the field energy supply device through the communication path, the method for controlling power supply further includes: when receiving an information interactive instruction sent by the field energy supply device through the communication path, performing a step of sending a response to the information interactive instruction to the field energy supply device through the communication path.

In an embodiment of the present disclosure, after sending the response to the idle communication indicative instruction to the field energy supply device through the communication path, the method for controlling power supply further includes: when receiving another idle communication indicative instruction sent by the field energy supply device through the communication path, performing the step of sending another waiting time extension instruction to the field energy supply device through the communication path.

In an embodiment of the present disclosure, before receiving an idle communication indicative instruction sent by the field energy supply device through the communication path, the method for controlling power supply further includes: receiving a searching instruction sent by the field energy supply device through the communication path; sending a searching response to the field energy supply device through the communication path.

In an embodiment of the present disclosure, before receiving an information interactive instruction sent by the field energy supply device through the communication path, the method for controlling power supply further includes: receiving a searching instruction sent by the field energy supply device through the communication path; sending a searching response to the field energy supply device through the communication path.

In an embodiment of the present disclosure, a waiting time extension instruction is further configured to instruct the field energy supply device to improve power of the field energy.

A system for controlling power supply is also provided in the present embodiment. The system for controlling power supply uses the method for controlling power supply according to the present embodiment, which is not described in detail.

Embodiment 9

Figure 11:
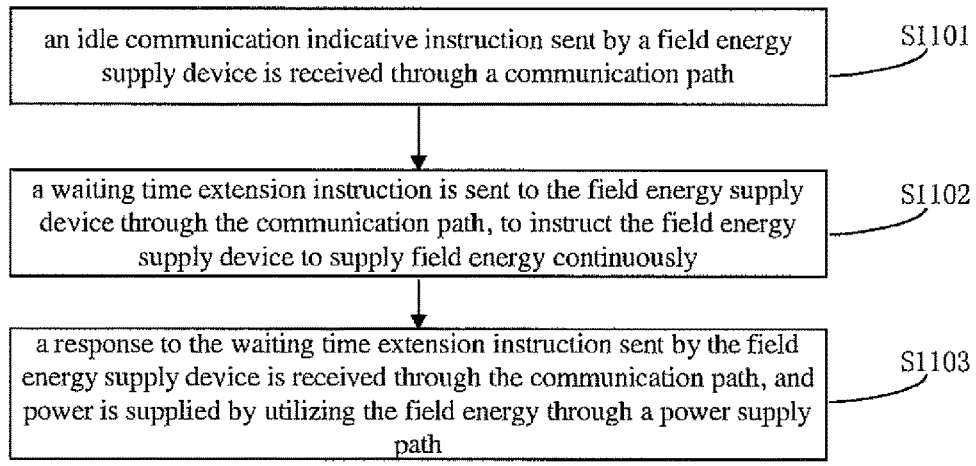
FIG. 11 is a flow chart of a method for controlling power supply according to embodiment 9 of the present disclosure.

This embodiment just provides a brief description of another specific implementation of the present disclosure, and concerning other parts not described in detail, reference is made to descriptions in embodiment 1. As shown in FIG. 11, a method for controlling power supply includes followings.

In step S1101, an idle communication indicative instruction sent by a field energy supply device is received through a communication path.

In step S1102, a waiting time extension instruction is sent to the field energy supply device through the communication path, to instruct the field energy supply device to supply field energy continuously.

In step S1103, a response to the waiting time extension instruction sent by the field energy supply device is received through the communication path, and power is supplied by utilizing the field energy through a power supply path.

Compared with the related art, in the method for controlling power supply according to the present disclosure, when the communication path and the power supply path of the device to be supplied with power share a coil and when the communication path is in a connection state, it is possible for the device to be supplied with power according to the present disclosure to obtain as much power as possible from the coil of the field energy supply device without affecting the near field communication (such as NFC communication) with the field energy supply device, and the field energy provided by the field energy supply device can be used to supply power to the device to be supplied with power for operating, or can be used to charge a built-in power supply of the device to be supplied with power, such that communication and power supply can be performed simultaneously, thus improving utilization of the electronic apparatus, and preventing waste of power.

In an embodiment of the present disclosure, before receiving the idle communication indicative instruction sent by the field energy supply device through the communication path, the method for controlling power supply further includes: receiving an information interactive instruction sent by the field energy supply device through the communication path; sending a response to the information interactive instruction to the field energy supply device through the communication path.

In an embodiment of the present disclosure, the waiting time extension instruction instructs a waiting time. After supplying power by utilizing the field energy through a power supply path, the method for controlling power supply further includes: when the waiting time runs out, performing the step of sending another waiting time extension instruction to the field energy supply device through the communication path.

In an embodiment of the present disclosure, the waiting time extension instruction instructs a waiting time. After supplying power by utilizing the field energy through a power supply path, the method for controlling power supply further includes: when the waiting time runs out, sending a response to the idle communication indicative instruction to the field energy supply device through the communication path.

In an embodiment of the present disclosure, after sending the response to the idle communication indicative instruction to the field energy supply device through the communication path, the method for controlling power supply further includes: when receiving an information interactive instruction sent by the field energy supply device through the communication path, performing a step of sending a response to the information interactive instruction to the field energy supply device through the communication path.

In an embodiment of the present disclosure, after sending the response to the idle communication indicative instruction to the field energy supply device through the communication path, the method for controlling power supply further includes: when receiving another idle communication indicative instruction sent by the field energy supply device through the communication path, performing the step of sending another waiting time extension instruction to the field energy supply device through the communication path.

In an embodiment of the present disclosure, before receiving an idle communication indicative instruction sent by the field energy supply device through the communication path, the method for controlling power supply further includes: receiving a searching instruction sent by the field energy supply device through the communication path; sending a searching response to the field energy supply device through the communication path.

In an embodiment of the present disclosure, before receiving an information interactive instruction sent by the field energy supply device through the communication path, the method for controlling power supply further includes: receiving a searching instruction sent by the field energy supply device through the communication path; sending a searching response to the field energy supply device through the communication path.

In an embodiment of the present disclosure, a waiting time extension instruction is further configured to instruct the field energy supply device to improve power of the field energy.

A system for controlling power supply is also provided in the present embodiment. The system for controlling power supply uses the method for controlling power supply according to the present embodiment, which is not described in detail.

Embodiment 10

Figure 12:
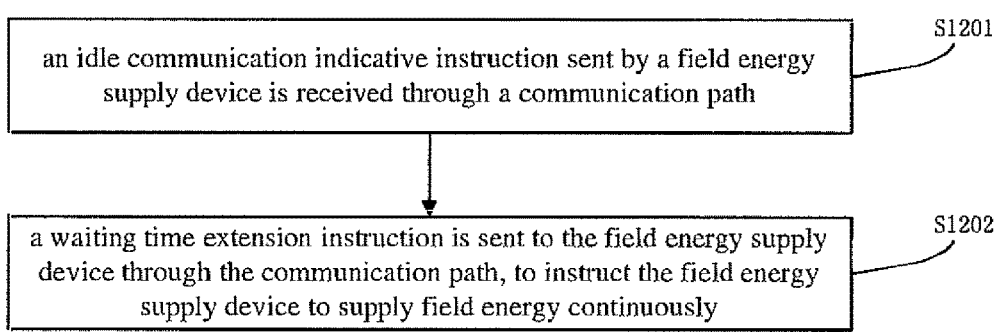
FIG. 12 is a flow chart of a method for controlling field energy according to embodiment 10 of the present disclosure.

This embodiment provides a method for controlling field energy, which is just described briefly herein, and concerning other parts not described in detail, reference is made to descriptions in embodiment 1. As shown in FIG. 12, a method for controlling field energy includes followings.

In step S1201, an idle communication indicative instruction sent by a field energy supply device is received through a communication path.

In step S1202, a waiting time extension instruction is sent to the field energy supply device through the communication path, to instruct the field energy supply device to supply field energy continuously.

Compared with the related art, with the method for controlling power supply according to the present disclosure, when the communication is idle, the field energy supply device can open field energy continuously, such that other devices can be supplied with power by utilizing the field energy, thus making full use of resources.

A system for controlling field energy is also provided in the present embodiment. The system for controlling field energy uses the method for controlling field energy according to the present embodiment, which is not described in detail.

Embodiment 11

Figure 13:
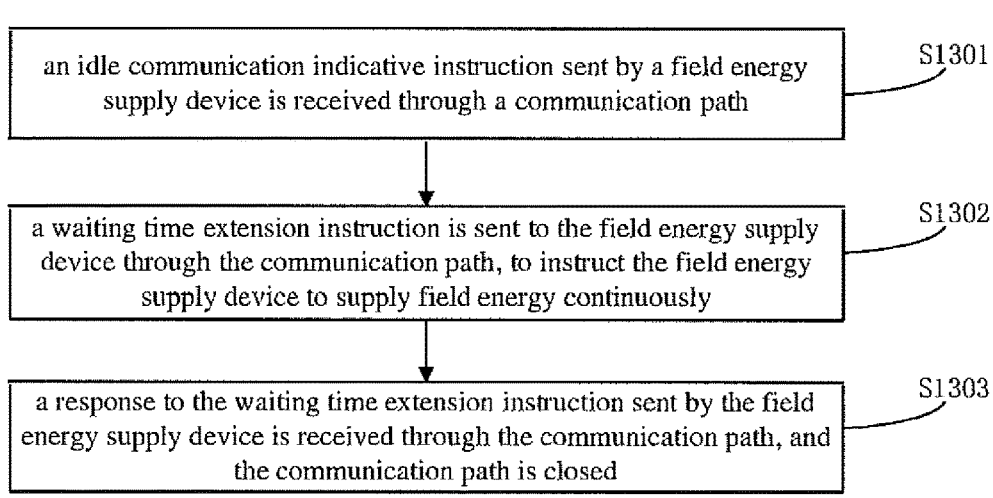
FIG. 13 is a flow chart of an on/off control method according to embodiment 11 of the present disclosure.

This embodiment provides an on/off control method, which is just described briefly herein, and concerning other parts not described in detail, reference is made to descriptions in embodiment 1. As shown in FIG. 13, the on/off control method includes followings.

In step S1301, an idle communication indicative instruction sent by a field energy supply device is received through a communication path.

In step S1302, a waiting time extension instruction is sent to the field energy supply device through the communication path, to instruct the field energy supply device to supply field energy continuously.

In step S1303, a response to the waiting time extension instruction sent by the field energy supply device is received through the communication path, and the communication path is closed.

Compared with the related art, with the on/off control method, the communication path can be closed, and when the communication path is in a closed state, the communication path and the chip or CPU connected to the communication path no longer consume power, such that other circuits (such as the power supply path sharing a coil with the communication path) can receive power to the maximum and supply power, thus improving power supply efficiency.

An on/off control system is also provided in the present embodiment. The on/off control system uses the on/off control method according to the present embodiment, which is not described in detail.

Embodiment 12

Figure 14:
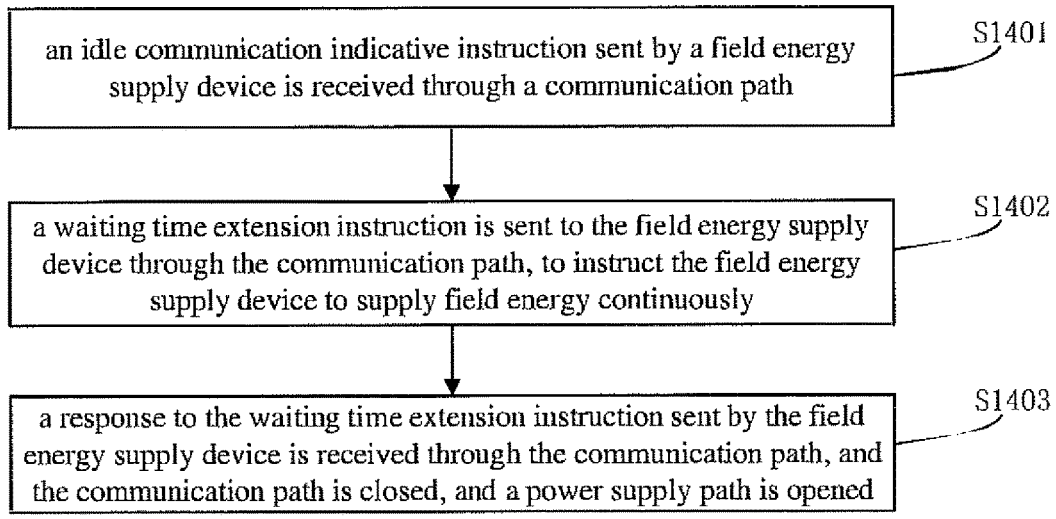
FIG. 14 is a flow chart of an on/off control method according to embodiment 12 of the present disclosure.

This embodiment provides an on/off control method, which is just described briefly herein, and concerning other parts not described in detail, reference is made to descriptions in embodiment 1. As shown in FIG. 14, the on/off control method includes followings.

In step S1401, an idle communication indicative instruction sent by a field energy supply device is received through a communication path.

In step S1402, a waiting time extension instruction is sent to the field energy supply device through the communication path, to instruct the field energy supply device to supply field energy continuously.

In step S1403, a response to the waiting time extension instruction sent by the field energy supply device is received through the communication path, and the communication path is closed, and a power supply path is opened.

Compared with the related art, with the on/off control method, the communication path can be closed, and when the communication path is in a closed state, the communication path and the chip or CPU connected to the communication path no longer consume power, such that other circuits (such as the power supply path sharing a coil with the communication path) can receive power to the maximum and supply power, thus improving power supply efficiency. In addition, when the communication path and the power supply path of the device to be supplied with power share a coil and when the communication path is in a connection state, the power supply path is in a closed state, thus ensuring communication stability of the communication path and eliminating impact of the power supply path on the communication path. Only when the communication is idle, the power supply path can be opened, such that the power supply path begins to supply power by utilizing the field energy. Therefore, it is possible for the device to be supplied with power according to the present disclosure to obtain as much power as possible from the coil of the field energy supply device without affecting the near field communication (such as NFC communication) with the field energy supply device, and the field energy provided by the field energy supply device can be used to supply power to the device to be supplied with power for operating, or can be used to charge a built-in power supply of the device to be supplied with power, such that communication and power supply can be performed simultaneously, thus improving utilization of the electronic apparatus and preventing waste of power.

An on/off control system is also provided in the present embodiment. The on/off control system uses the on/off control method according to the present embodiment, which is not described in detail.

Embodiment 13

Figure 15:
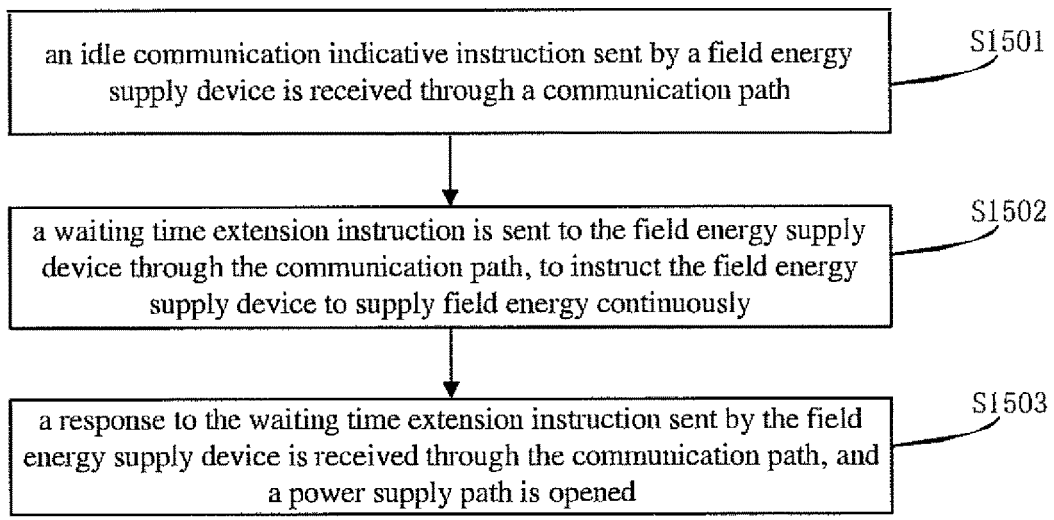
FIG. 15 is a flow chart of an on/off control method according to embodiment 13 of the present disclosure.

This embodiment provides an on/off control method, which is just described briefly herein, and concerning other parts not described in detail, reference is made to descriptions in embodiment 1. As shown in FIG. 15, the on/off control method includes followings.

In step S1501, an idle communication indicative instruction sent by a field energy supply device is received through a communication path.

In step S1502, a waiting time extension instruction is sent to the field energy supply device through the communication path, to instruct the field energy supply device to supply field energy continuously.

In step S1503, a response to the waiting time extension instruction sent by the field energy supply device is received through the communication path, and a power supply path is opened.

Compared with the related art, when the communication path and the power supply path of the device to be supplied with power share a coil and when the communication path is in a connection state, the power supply path is in a closed state, thus ensuring communication stability of the communication path and eliminating impact of the power supply path on the communication path. When the communication is idle, the power supply path can be opened, such that the power supply path begins to supply power by utilizing the field energy. Therefore, it is possible for the device to be supplied with power according to the present disclosure to obtain as much power as possible from the coil of the field energy supply device without affecting the near field communication (such as NFC communication) with the field energy supply device, and the field energy provided by the field energy supply device can be used to supply power to the device to be supplied with power for operating, or can be used to charge a built-in power supply of the device to be supplied with power, such that communication and power supply can be performed simultaneously, thus improving utilization of the electronic apparatus and preventing waste of power.

An on/off control system is also provided in the present embodiment. The on/off control system uses the on/off control method according to the present embodiment, which is not described in detail.

Embodiment 14

Figure 16:
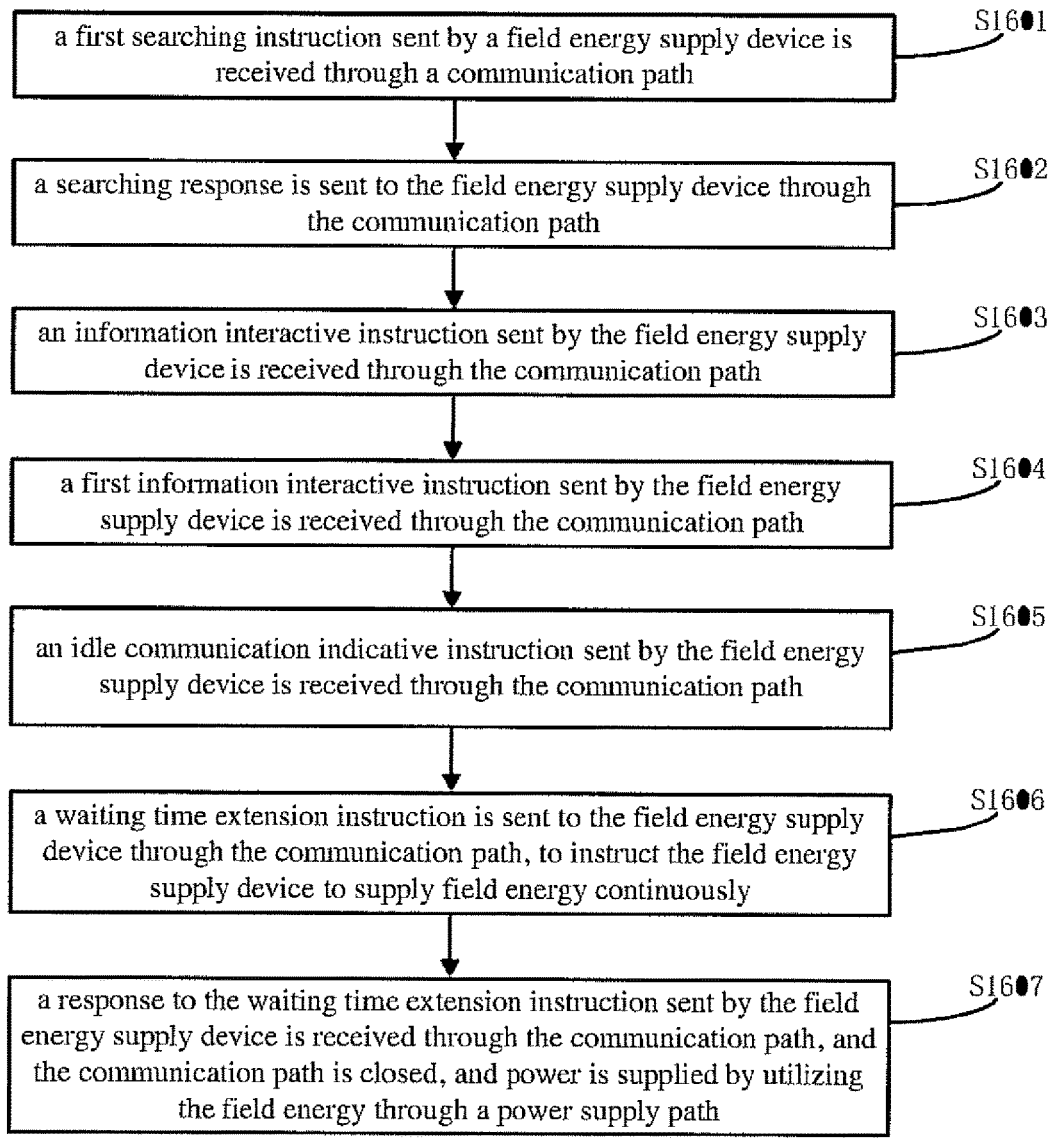
FIG. 16 is a flow chart of a method for controlling power supply according to embodiment 14 of the present disclosure.

This embodiment just provides a brief description of another specific implementation of the present disclosure, and concerning other parts not described in detail, reference is made to descriptions in embodiment 1. As shown in FIG. 16, a method for controlling power supply includes followings.

In step S1601, a searching instruction sent by a field energy supply device is received through a communication path.

In step S1602, a searching response is sent to the field energy supply device through the communication path.

In step S1603, an information interactive instruction sent by the field energy supply device is received through the communication path.

In step S1604, a response to the information interactive instruction is sent to the field energy supply device through the communication path.

In step S1605, an idle communication indicative instruction sent by the field energy supply device is received through the communication path.

In step S1606, a waiting time extension instruction is sent to the field energy supply device through the communication path, to instruct the field energy supply device to supply field energy continuously.

In step S1607, a response to the waiting time extension instruction sent by the field energy supply device is received through the communication path, and the communication path is closed, and power is supplied by utilizing the field energy through a power supply path.

Compared with the related art, in the method for controlling power supply according to the present disclosure, when the communication path and the power supply path of the device to be supplied with power share a coil and when the communication path is in a connection state, the device to be supplied with power can obtain power from the coil of the field energy supply device while performing near field communication (such as NFC communication) with the field energy supply device, and the field energy provided by the field energy supply device can be used to supply power to the device to be supplied with power for operating, or can be used to charge a built-in power supply of the device to be supplied with power, such that communication and power supply can be performed simultaneously, thus improving utilization of the electronic apparatus and preventing waste of power. In addition, in the present disclosure, the communication path can be closed, and when the communication path is in a closed state, the communication path and the chip or CPU connected to the communication path no longer consume power, such that the power supply path can receive power to the maximum and supply power, thus improving power supply efficiency.

In an embodiment of the present disclosure, the waiting time extension instruction instructs a waiting time. After closing the communication path, the method for controlling power supply further includes step S1608a: before the waiting time runs out, opening the communication path, and performing step S1606 of sending a waiting time extension instruction to the field energy supply device through the communication path In an embodiment of the present disclosure, the waiting time extension instruction instructs a waiting time. After closing the communication path, the method for controlling power supply further includes step S1608b: before the waiting time runs out, opening the communication path, and sending a response to the idle communication indicative instruction to the field energy supply device through the communication path.

Certainly, in an embodiment of the present disclosure, steps S1606 to S1608a can be performed cyclically, until there is no need to continue the power supply, thus ensuring continuous power supply when the communication is idle. When there is no need to continue the power supply, step S1608b is performed after performing steps S1606 and S1607.

In an embodiment of the present disclosure, before opening the communication path, the method for controlling power supply further includes: closing the power supply path.

In an embodiment of the present disclosure, after performing step S1608b of sending the response to the idle communication indicative instruction to the field energy supply device through the communication path, the method for controlling power supply further includes step S1609a: when receiving an information interactive instruction sent by the field energy supply device through the communication path, performing step S1604 of sending a response to the information interactive instruction to the field energy supply device through the communication path.

In an embodiment of the present disclosure, after performing step S1608b of sending the response to the idle communication indicative instruction to the field energy supply device through the communication path, the method for controlling power supply further includes step S1609b: when receiving another idle communication indicative instruction sent by the field energy supply device through the communication path, performing step S1606 of sending a waiting time extension instruction to the field energy supply device through the communication path.

In an embodiment of the present disclosure, the waiting time extension instruction is further configured to instruct the field energy supply device to improve power of the field energy.

Certainly, in this embodiment, step S1603 and step S1604 are alternative steps, which may not be performed in practical applications.

A system for controlling power supply is also provided in the present embodiment. The system for controlling power supply uses the method for controlling power supply according to the present embodiment, which is not described in detail.

Embodiment 15

Figure 17:
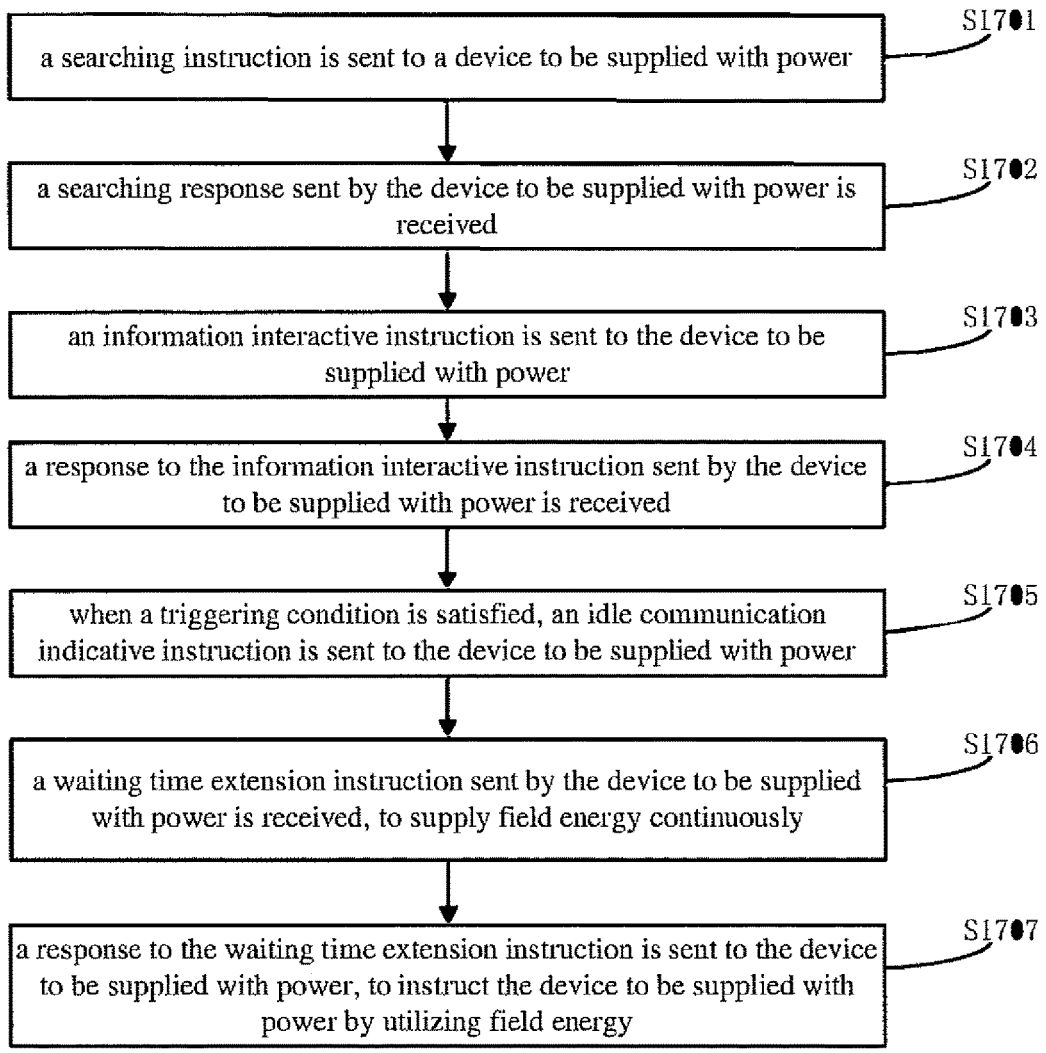
FIG. 17 is a flow chart of a method for controlling power supply according to embodiment 15 of the present disclosure.

This embodiment just provides a brief description of a specific implementation of the present disclosure, and concerning other parts not described in detail, reference is made to descriptions in embodiment 2. As shown in FIG. 17, a method for controlling power supply includes followings.

In step S1701, a searching instruction is sent to a device to be supplied with power.

In step S1702, a searching response sent by the device to be supplied with power is received.

In step S1703, an information interactive instruction is sent to the device to be supplied with power.

In step S1704, a response to the information interactive instruction sent by the device to be supplied with power is received.

In step S1705, when a triggering condition is satisfied, an idle communication indicative instruction is sent to the device to be supplied with power.

In step S1706, a waiting time extension instruction sent by the device to be supplied with power is received, to supply field energy continuously.

In step S1707, a response to the waiting time extension instruction is sent to the device to be supplied with power, to instruct the device to be supplied with power by utilizing field energy.

Compared with the related art, in the method for controlling power supply according to the present disclosure, when the triggering condition is satisfied, the field energy supply device can send the idle communication indicative instruction to the device to be supplied with power, to inform the device to be supplied with power that the current communication is idle and during the idle communication time power can be supplied, and the field energy provided by the field energy supply device can be used to supply power to the device to be supplied with power for operating, or can be used to charge a built-in power supply of the device to be supplied with power, and after receiving the waiting time extension instruction sent by the device to be supplied with power, the field energy supply device responds to it, thus can simultaneously communicate with and supply power to the device to be supplied with power, thereby improving utilization of the electronic apparatus and preventing waste of power.

In an embodiment of the present disclosure, the triggering condition includes: determining the current state as a communication idle state; or receiving a triggering instruction.

In an embodiment of the present disclosure, the waiting time extension instruction instructs a waiting time. After sending the response to the waiting time extension instruction to the device to be supplied with power, the method for controlling power supply further includes: before the waiting time runs out and, when receiving another waiting time extension instruction sent by the device to be supplied with power is received, performing a step of sending a response to the another waiting time extension instruction to the device to be supplied with power.

In an embodiment of the present disclosure, the waiting time extension instruction instructs a waiting time. After sending the response to the waiting time extension instruction to the device to be supplied with power, the method for controlling power supply further includes: before the waiting time runs out, receiving a response to the idle communication indicative instruction sent by the device to be supplied with power.

Certainly, in an embodiment of the present disclosure, the following steps may be performed circularly: receiving a waiting time extension instruction sent by the device to be supplied with power to supply field energy continuously, sending a response to the waiting time extension instruction to the device to be supplied with power to instruct the device to be supplied with power by utilizing field energy, and before the waiting time runs out and when another waiting time extension instruction sent by the device to be supplied with power is received, performing a step of sending a response to the another waiting time extension instruction to the device to be supplied with power, until there is no need to continue the power supply, thus ensuring continuous power supply when the communication is idle. When there is no need to continue the power supply, a response to the idle communication indicative instruction sent by the device to be supplied with power is received before the waiting time runs out.

In an embodiment of the present disclosure, after receiving a response to the idle communication indicative instruction sent by the device to be supplied with power, the method for controlling power supply further includes: performing step S1703 of sending an information interactive instruction to the device to be supplied with power.

In an embodiment of the present disclosure, after receiving a response to the idle communication indicative instruction sent by the device to be supplied with power, the method for controlling power supply further includes: performing step S1705 of sending another idle communication indicative instruction to the device to be supplied with power when a triggering condition is satisfied.

In an embodiment of the present disclosure, a waiting time extension instruction is further configured to instruct the field energy supply device to improve power of the field energy, and the method for controlling power supply further includes: improving power of the field energy, and outputting field energy with improved power.

Certainly, in this embodiment, step S1703 and step S1704 are alternative steps, which may not be performed in practical applications.

A system for controlling power supply is also provided in the present embodiment. The system for controlling power supply uses the method for controlling power supply according to the present embodiment, which is not described in detail.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution is different from that which is depicted or discussed, including executing functions in a substantially simultaneous manner or in an opposite order according to the related functions. This should be understood by those skilled in the art to which embodiments of the present disclosure belong.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for controlling power supply, comprising:
   receiving an idle communication indicative instruction sent by a field energy supply device through a communication path, wherein the idle communication indicative instruction indicates that current communication is in an idle state;
   sending a waiting time extension instruction to the field energy supply device through the communication path, to instruct the field energy supply device to supply field energy continuously; and
   receiving a response to the waiting time extension instruction sent by the field energy supply device through the communication path, closing the communication path, and supplying with power by utilizing the field energy through a power supply path.

2. The method according to claim 1, before receiving the idle communication indicative instruction sent by the field energy supply device through the communication path, further comprising:
   receiving an information interactive instruction sent by the field energy supply device through the communication path; and
   sending a response to the information interactive instruction to the field energy supply device through the communication path.

3. The method according to claim 1, wherein the waiting time extension instruction instructs a waiting time, and after closing the communication path, the method further comprises:
   before the waiting time runs out, opening the communication path, and performing the step of sending another waiting time extension instruction to the field energy supply device through the communication path.

4. The method according to claim 1, wherein the waiting time extension instruction instructs a waiting time, and after closing the communication path, the method further comprises:
   before the waiting time runs out, opening the communication path, and sending a response to the idle communication indicative instruction to the field energy supply device through the communication path.

5. The method according to claim 3, before opening the communication path, further comprising: closing the power supply path.

6. The method according to claim 4, after sending the response to the idle communication indicative instruction to the field energy supply device through the communication path, further comprising:
   when receiving an information interactive instruction sent by the field energy supply device through the communication path, performing a step of sending a response to the information interactive instruction to the field energy supply device through the communication path.

7. The method according to claim 4, after sending the response to the idle communication indicative instruction to the field energy supply device through the communication path, further comprising:
   when receiving another idle communication indicative instruction sent by the field energy supply device through the communication path, performing the step of sending another waiting time extension instruction to the field energy supply device through the communication path.

8. The method according to claim 1, before receiving an idle communication indicative instruction sent by the field energy supply device through the communication path, further comprising:
   receiving a searching instruction sent by the field energy supply device through the communication path; and
   sending a searching response to the field energy supply device through the communication path.

9. The method according to claim 2, before receiving an information interactive instruction sent by the field energy supply device through the communication path, further comprising:
   receiving a searching instruction sent by the field energy supply device through the communication path; and
   sending a searching response to the field energy supply device through the communication path.

10. The method according to claim 1, wherein a waiting time extension instruction is further configured to instruct the field energy supply device to improve power of the field energy.

11. A method for controlling power supply, comprising:
    when a triggering condition is satisfied, sending an idle communication indicative instruction to a device to be supplied with power, wherein the idle communication indicative instruction indicates that current communication is in an idle state; the triggering condition comprises one of followings: determining a current state as an idle communication state; and receiving a triggering instruction;
    receiving a waiting time extension instruction sent by the device, to supply field energy continuously; and
    sending a response to the waiting time extension instruction to the device, to instruct the device to be supplied with power by utilizing the field energy.

12. The method according to claim 11, before sending the idle communication indicative instruction to the device, further comprising:

sending an information interactive instruction to the device;

receiving a response to the information interactive instruction sent by the device.

13. The method according to claim 11, wherein the waiting time extension instruction instructs a waiting time, and after sending the response to the waiting time extension instruction to the device, the method further comprises:

before the waiting time runs out and when another waiting time extension instruction sent by the device is received, performing a step of sending a response to the another waiting time extension instruction to the device.

14. The method according to claim 11, wherein the waiting time extension instruction instructs a waiting time, and after sending the response to the waiting time extension instruction to the device, the method further comprises:

before the waiting time runs out, receiving a response to the idle communication indicative instruction sent by the device.

15. The method according to claim 14, after receiving the response to the idle communication indicative instruction sent by the device, further comprising:

performing a step of sending an information interactive instruction to the device.

16. The method according to claim 14, after receiving the response to the idle communication indicative instruction sent by the device, further comprising:

when the triggering condition is satisfied, performing a step of sending another idle communication indicative instruction to the device.

17. The method according to claim 11, wherein when the triggering condition is satisfied and before an idle communication indicative instruction is sent to the device, the method further comprises:

sending a searching instruction to the device; and receiving a searching response sent by the device.

18. The method according to claim 12, before sending an information interactive instruction to the device, further comprising:

sending a searching instruction to the device;

receiving a searching response sent by the device.

19. A system for controlling power supply, comprising a device to be supplied with power and a field energy supply device; wherein the device to be supplied with power comprises:

one or more chips, and a non-transitory computer-readable storage medium having commands stored therein;

wherein, when the commands are executed, the one or more chips are configured to perform:

receiving an idle communication indicative instruction sent by a field energy supply device through a communication path, sending a waiting time extension instruction to the field energy supply device through the communication path, to instruct the field energy supply device to supply field energy continuously, and receiving a response to the waiting time extension instruction sent by the field energy supply device through the communication path;

closing the communication path; and supplying power by utilizing the field energy through a power supply path; and the field energy supply device comprises:

one or more chips, and a non-transitory computer-readable storage medium having commands stored therein;

wherein, when the commands are executed, the one or more chips are configured to perform:

sending an idle communication indicative instruction to a device to be supplied with power when a triggering condition is satisfied, receiving a waiting time extension instruction sent by the device, to instruct a field energy supplying module to supply field energy continuously, sending a response to the waiting time extension instruction to the device, to instruct the device to be supplied with power by utilizing the field energy; wherein the idle communication indicative instruction indicates that current communication is in an idle state; the triggering condition comprises one of followings: determining a current state as an idle communication state; and receiving a triggering instruction;

supplying the field energy.

* * * * *